(12) United States Patent
Kawaguchi et al.

(10) Patent No.: US 11,469,692 B2
(45) Date of Patent: Oct. 11, 2022

(54) THYRISTOR STARTER

(71) Applicant: TOSHIBA MITSUBISHI-ELECTRIC INDUSTRIAL SYSTEMS CORPORATION, Chuo-ku (JP)

(72) Inventors: Hironori Kawaguchi, Chuo-ku (JP); Hiroshi Ogino, Chuo-ku (JP); Yasuaki Matsumoto, Chuo-ku (JP); Akinobu Ando, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 63 days.

(21) Appl. No.: 16/970,533

(22) PCT Filed: Feb. 19, 2018

(86) PCT No.: PCT/JP2018/005656
§ 371 (c)(1),
(2) Date: Aug. 17, 2020

(87) PCT Pub. No.: WO2019/159346
PCT Pub. Date: Aug. 22, 2019

(65) Prior Publication Data
US 2021/0091693 A1    Mar. 25, 2021

(51) Int. Cl.
*H02P 6/22* (2006.01)
*H02P 7/29* (2016.01)
(Continued)

(52) U.S. Cl.
CPC ............ *H02P 6/28* (2016.02); *H02M 7/1552* (2013.01); *H02M 7/525* (2013.01); *H02P 6/17* (2016.02); *H02P 25/026* (2013.01)

(58) Field of Classification Search
CPC .................................. H02P 25/08; H02P 6/08
See application file for complete search history.

(56) References Cited

U.S. PATENT DOCUMENTS

2015/0236622 A1* 8/2015 Ogino ...................... H02P 1/46
                                                          318/400.11
2015/0365008 A1* 12/2015 Ogino ..................... H02M 5/44
                                                          363/37
(Continued)

FOREIGN PATENT DOCUMENTS

JP      10-28391 A    1/1998
JP      11-75389 A    3/1999
(Continued)

OTHER PUBLICATIONS

Japanese Office Action dated Jun. 29, 2021 in Japanese Patent Application No. 2019-571930 (with English translation), 9 pages.
(Continued)

*Primary Examiner* — Muhammad S Islam
*Assistant Examiner* — Charles S Laughlin
(74) *Attorney, Agent, or Firm* — Oblon, McClelland, Maier & Neustadt, L.L.P.

(57) ABSTRACT

A converter controller configured to control a firing phase of a converter includes an integral element integrating a deviation of DC current from a current command value and generates a voltage command value of output voltage of the converter by performing control calculation of the deviation. In a first mode of performing commutation of an inverter by intermittently setting DC current to zero, the converter controller sets DC current to zero for a predetermined pause time by narrowing a phase control angle simultaneously with a commutation command for the inverter. When the control calculation is resumed immediately after the pause time, the converter controller uses a control amount calculated in control calculation immediately before the pause time as a preset value of the integral element immediately after the pause time.

11 Claims, 19 Drawing Sheets

(51) Int. Cl.
*H02P 21/22* (2016.01)
*H02P 6/28* (2016.01)
*H02P 6/17* (2016.01)
*H02M 7/155* (2006.01)
*H02M 7/525* (2006.01)
*H02P 25/026* (2016.01)

(56) References Cited

U.S. PATENT DOCUMENTS

2016/0248354 A1* 8/2016 Liu .................. H02P 27/08
2017/0279365 A1* 9/2017 Besselmann ......... H02H 7/1216

FOREIGN PATENT DOCUMENTS

| JP | 2000-166007 A | 6/2000 |
|---|---|---|
| JP | 2000-287494 A | 10/2000 |
| JP | 2003-199214 A | 7/2003 |
| JP | 2004-282948 A | 10/2004 |
| JP | 2006-296055 A | 10/2006 |
| JP | 2008-5632 A | 1/2008 |
| JP | 2008-172952 A | 7/2008 |
| JP | 2013-51799 A | 3/2013 |
| WO | WO 2014/033849 A1 | 3/2014 |

OTHER PUBLICATIONS

Extended European Search Report dated Aug. 30, 2021 in European Patent Application No. 18906487.6, 8 pages.
International Preliminary Report on Patentability and Written Opinion dated Sep. 3, 2020 in PCT/JP2018/005656 (with English language translation), 16 pages.
International Search Report dated May 22, 2018 in PCT/JP2018/005656 filed Feb. 19, 2018, 1 page.
Korean Office Action dated Jan. 26, 2022 in Korean Patent Application No. 10-2020-7026988 (with unedited computer generated English translation), 15 pages.
Ryu, H.-S., et al., "A Study on Starting Algorithm of Large Synchronous Motor for Gas Turbine in Field-Weakening Region using SFC", Transactions of Korean Institute of Power Electronics, 2008, vol. 13, No. 6, pp. 411-419 (with English abstract).

* cited by examiner

THYRISTOR STARTER

TECHNICAL FIELD

The present invention relates to a thyristor starter.

BACKGROUND ART

Thyristor starters for starting synchronous machines such as generators and motors have been developed (for example, see WO2014/033849 (PTL 1)). A thyristor starter includes a converter converting AC power into DC power, a DC reactor smoothing DC power, and an inverter converting DC power applied from the converter through the DC reactor into AC power with a variable frequency to supply the converted AC power to a synchronous machine. The AC power supplied to the synchronous machine is controlled whereby the synchronous machine in a stop state can be started and driven at a predetermined rotation speed.

CITATION LIST

Patent Literature

PTL 1: WO2014/033849

SUMMARY OF INVENTION

Technical Problem

In the thyristor starter described above, commutation (transfer of current) of the inverter may sometimes fail since induced voltage produced in the synchronous machine is low at start up or at a low speed of the synchronous machine. For this reason, when the rotation speed of the synchronous machine is low, "intermittent commutation" is employed in which commutation of the inverter is performed by intermittently setting DC current output from the converter to zero.

In intermittent commutation, DC current flowing through the DC reactor is temporarily set to zero by narrowing the phase control angle of the converter simultaneously with a commutation command to the inverter, and then a gate pulse is applied again to a thyristor of the inverter to be commutated next, to commutate the thyristor. When DC current is zero for a certain time (equivalent to the time required for extinguishing the thyristor of the inverter), narrowing of the phase control angle is cleared in the converter, and control of a firing phase for matching DC current with a current command value is resumed. DC current then starts flowing again through the DC reactor.

Here, if DC current lags behind the current command value at the time of resuming control of the firing phase of the converter after DC current is set to zero, the acceleration torque of the synchronous machine may temporarily decrease. As a result, the torque of the synchronous machine fluctuates every time a commutation command for the inverter is produced, leading to instability in the speed control of the synchronous machine. Moreover, the speed-up rate (the rate at which the rotation speed increases) of the synchronous machine decreases, and consequently, it may take time to start the synchronous machine.

The present invention is made in order to solve the problem above, and an object of the present invention is to provide a thyristor starter capable of improving the stability in the speed control of the synchronous machine in intermittent commutation.

Solution to Problem

According to an aspect of the present invention, a thyristor starter configured to start a synchronous machine includes a converter that converts AC power into DC power, a DC reactor that smoothes the DC power, an inverter that converts the DC power applied from the converter through the DC reactor into AC power with a variable frequency and supplies the AC power to the synchronous machine, a position detector that detects a rotor position of the synchronous machine, a first controller, and a second controller. The first controller controls a firing phase of a thyristor in the inverter, based on a detection signal of the position detector. The second controller controls a firing phase of a thyristor in the converter such that DC current flowing through the DC reactor matches a current command value, based on a detection signal of the position detector. The thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine. The second controller includes a current controller and a control angle calculator. The current controller at least includes an integral element integrating a deviation of the DC current from the current command value and generates a voltage command value of output voltage of the converter by performing control calculation of the deviation. The control angle calculator calculates a phase control angle of a thyristor in the converter, based on the voltage command value. In the first mode, the control angle calculator sets the DC current to zero for a predetermined pause time by narrowing the phase control angle simultaneously with a commutation command for the inverter. In the first mode, when the control calculation is resumed immediately after the pause time, the current controller uses a control amount calculated by the control calculation immediately before the pause time as a preset value of the integral element immediately after the pause time.

According to another aspect of the present invention, a thyristor starter that starts a synchronous machine includes a converter that converts AC power into DC power, a DC reactor that smoothes the DC power, an inverter that converts the DC power applied from the converter through the DC reactor into AC power with a variable frequency and supplies the AC power to the synchronous machine, a position detector that detects a rotor position of the synchronous machine, a voltage detector that detects DC voltage input to the inverter, a first controller, and a second controller. The first controller controls a firing phase of a thyristor in the inverter, based on a detection signal of the position detector. The second controller controls a firing phase of a thyristor in the converter such that DC current flowing through the DC reactor matches a current command value, based on a detection signal of the position detector. The thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine. The second controller includes a current controller and a control angle calculator. The current controller at least includes an integral element integrating a deviation of the DC current from the current command value and generates a voltage command value of output voltage of the converter by performing control calculation of the deviation. The control angle calculator calculates a phase control angle of a thyristor in the converter, based on the voltage command value. In the first mode, the control angle calculator sets the DC current to zero for a predetermined pause time by narrowing the phase control angle simultaneously with a commutation command for the inverter. In the first mode, when the control calculation is resumed immediately after the pause time, the current controller uses DC voltage detected by the voltage detector immediately before the pause time as a preset value of the integral element immediately after the pause time.

According to another aspect, a thyristor starter that starts a synchronous machine includes a converter that converts AC power into DC power, a DC reactor that smoothes the DC power, an inverter that converts the DC power applied from the converter through the DC reactor into AC power with a variable frequency and supplies the AC power to the synchronous machine, a voltage detector that detects AC voltage supplied from the inverter to the synchronous machine, a first controller, and a second controller. The first controller generates a firing command to be applied to a thyristor in the inverter, based on a detection signal of the voltage detector. The second controller controls a firing phase of a thyristor in the converter such that DC current flowing through the DC reactor matches a current command value. The thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine. The second controller includes a current controller and a control angle calculator. The current controller at least includes an integral element integrating a deviation of the DC current from the current command value and generates a voltage command value of output voltage of the converter by performing control calculation of the deviation. The control angle calculator calculates a phase control angle of a thyristor in the converter, based on the voltage command value. In the first mode, the control angle calculator sets the DC current to zero for a predetermined pause time by narrowing the phase control angle simultaneously with a commutation command for the inverter. In the first mode, the current controller calculates DC voltage appearing between input terminals of the inverter, based on a detection signal of the voltage detector and the firing command. When the control calculation is resumed immediately after the pause time, the current controller uses the calculated DC voltage as a preset value of the integral element immediately after the pause time.

According to another aspect, a thyristor starter that starts a synchronous machine includes a converter that converts AC power into DC power, a DC reactor that smoothes the DC power, an inverter that converts the DC power applied from the converter through the DC reactor into AC power with a variable frequency and supplies the AC power to the synchronous machine, a first controller, and a second controller. The first controller controls a firing phase of a thyristor in the inverter. The second controller controls a firing phase of a thyristor in the converter such that DC current flowing through the DC reactor matches a current command value. The thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine. The second controller includes a current controller and a control angle calculator. The current controller at least includes an integral element integrating a deviation of the DC current from the current command value and generates a voltage command value of output voltage of the converter by performing control calculation of the deviation. The control angle calculator calculates a phase control angle of a thyristor in the converter, based on the voltage command value. In the first mode, the control angle calculator sets the DC current to zero for a predetermined pause time by narrowing the phase control angle simultaneously with a commutation command for the inverter. In the first mode, when the control calculation is resumed immediately after the pause time, the current controller uses a value obtained by adding an amount of voltage drop by commutation inductance on an input side of the converter to an estimate value of DC voltage input to the inverter, as a preset value of the integral element immediately after the pause time.

Advantageous Effects of Invention

The present invention can increase the following characteristic of DC current to a current command in intermittent commutation of a thyristor starter and thereby can improve the stability in the speed control of the synchronous machine.

DESCRIPTION OF EMBODIMENTS

Embodiments of the present invention will be described in detail below with reference to the drawings. The same or corresponding parts are denoted by the same reference signs and a description thereof will not be repeated.

First Embodiment

Figure 1:
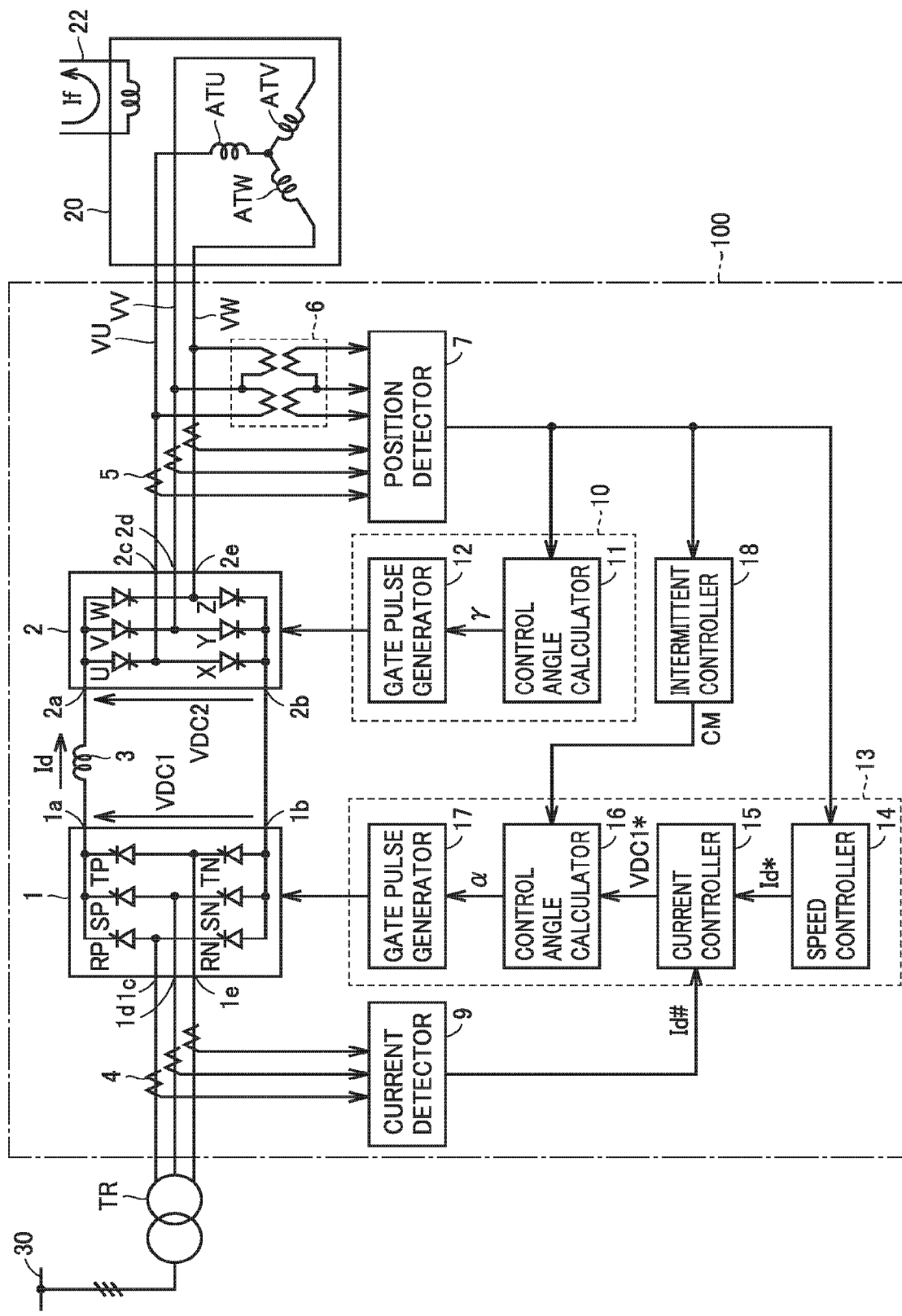
FIG. 1 is a circuit block diagram showing a configuration of a thyristor starter according to a first embodiment of the present invention.

FIG. 1 is a circuit block diagram showing a configuration of a thyristor starter according to a first embodiment of the present invention. Referring to FIG. 1, a thyristor starter 100 according to the present first embodiment starts a synchronous machine 20 by accelerating the stopped synchronous machine 20 to a predetermined rotation speed.

Synchronous machine 20 includes a stator having armature windings ATU, ATV, ATW and a rotor having a field winding 22. Synchronous machine 20 is coupled to, for example, a gas turbine of a thermal power plant and rotatably driven by the gas turbine. In the following description, a predetermined rotation speed may be referred to as "rated rotation speed".

Thyristor starter 100 is connected to the secondary side of a transformer TR. The primary side of transformer TR is connected to an AC power supply 30. Transformer TR converts three-phase AC voltage supplied from AC power supply 30 into three-phase AC voltage having a predetermined voltage value and applies the three-phase AC voltage to thyristor starter 100.

Thyristor starter 100 includes a converter 1, a DC reactor 3, and an inverter 2. Converter 1 is a three-phase full-wave rectifier including at least six thyristors RP, SP, TP, RN, SN, TN. Thyristors RP, SP, TP have cathodes connected together to positive-side output terminal 1a and anodes connected to input terminals 1c, 1d, 1e, respectively. Thyristors RN, SN, TN have cathodes connected to input terminals 1c, 1d, 1e, respectively, and anodes connected together to negative-side output terminal 1b. Converter 1 converts three-phase AC power from transformer TR into DC power with a variable voltage.

DC reactor 3 is connected between positive-side output terminal 1a of converter 1 and positive-side output terminal 2a of inverter 2. DC reactor 3 smooths DC current Id output from converter 1. Negative-side output terminal 1b of converter 1 and negative-side output terminal 2b of inverter 2 are connected to each other. Another DC reactor 3 may be connected between negative-side output terminal 1b of converter 1 and negative-side output terminal 2b of inverter 2.

Three output terminals 2c, 2d, 2e of inverter 2 are connected to three armature windings ATU, ATV, ATW of synchronous machine 20, respectively. Inverter 2 is a three-phase external-commutated inverter including at least six thyristors U, V, W, X, Y, Z. Thyristors U, V, W have anodes connected together to positive-side input terminal 2a and cathodes connected to output terminals 2c, 2d, 2e, respectively. Thyristors X, Y, Z have anodes connected to output terminals 2c, 2d, 2e, respectively, and cathodes connected together to negative-side input terminal 2b.

Thyristor starter 100 further includes current transformers 4, 5, a voltage detector 6, a position detector 7, a current detector 9, an inverter controller 10, a converter controller 13, and an intermittent controller 18.

Current transformer 4 detects three-phase AC current flowing from transformer TR to converter 1 and applies a signal indicating the detected value to current detector 9. Current detector 9 calculates DC current Id # proportional to DC current Id output from converter 1, based on a signal from current transformer 4, and applies a signal indicating the calculated value to converter controller 13. Specifically, current detector 9 has a full-wave rectifying diode rectifier, and rectifies and converts the detected three-phase AC current into DC current Id #.

Current transformer 5 detects current flowing through armature windings ATU, ATV, ATW of synchronous machine 20 from inverter 2 and applies a signal indicating the detected value to position detector 7.

Voltage detector 6 detects instantaneous values of three phase AC voltages VU, VV, VW supplied from inverter 2 to synchronous machine 20 and applies a signal indicating the detected value to position detector 7. Specifically, voltage detector 6 detects two of line voltages of three phase AC voltages in armature windings ATU, ATV, ATW of synchronous machine 20 (in FIG. 1, AC voltage VU-VV between the U phase and the V phase and AC voltage VV-VW between the V phase and the W phase). Voltage detector 6 may be configured to detect three line voltages (AC voltage VU-VV between the U phase and the V phase, AC voltage VV-VW between the V phase and the W phase, and AC voltage VW-VU between the W phase and the U phase).

In this way, AC voltages of the U phase, the V phase, and the W phase can be obtained through calculation by detecting at least two line voltages of AC voltage VU-VV between the U phase and the V phase, AC voltage VV-VW between the V phase and the W phase, and AC voltage VW-VU between the W phase and the U phase. The conversion from line voltage to phase voltage is performed in voltage detector 6 or position detector 7.

Position detector 7 detects the position of the rotor of synchronous machine 20 based on signals from current transformer 5 and voltage detector 6 and applies a signal indicating the detected value to inverter controller 10 and converter controller 13.

Intermittent controller 18 generates a commutation command CM based on a signal from position detector 7. Specifically, intermittent controller 18 generates a commutation command CM of one-shot pulse for each timing when line voltages VU-VV, VV-VW, VW-VU of synchronous machine 20 become 0 V. More specifically, commutation command PM is generated every rotation position (electrical angle) 60° of the rotor of synchronous machine 20. Commutation command CM is used to intermittently set DC current Id to zero in the intermittent commutation mode described later. When the rotation speed of synchronous machine 20 increases and thyristor starter 100 shifts from the intermittent commutation mode to the load commutation mode, intermittent controller 18 stops generation of commutation command CM.

Inverter controller 10 controls a firing phase of inverter 2 based on a signal from position detector 7. Specifically, inverter controller 10 includes a control angle calculator 11 and a gate pulse generator 12. Control angle calculator 11 calculates a phase control angle (firing angle) γ based on the detected position of the rotor of synchronous machine 20 and applies the calculated phase control angle γ to gate pulse generator 12. Gate pulse generating circuit 40 generates a gate pulse (firing command) to be applied to the gate of a thyristor of inverter 2, based on phase control angle γ received from control angle calculator 11. Inverter controller 10 corresponds to an embodiment of "first controller".

Converter controller 13 controls a firing phase of converter 1, based on a signal from position detector 7, a signal from current detector 9, and commutation command CM from intermittent controller 18. Specifically, converter controller 13 controls a firing phase of converter 1 such that DC current Id # detected by current detector 9 matches current command value Id*. Since DC current Id # is proportional to DC current Id, matching DC current Id # with current command value Id* is equivalent to matching DC current Id with current command value Id*. Converter controller 13 corresponds to an embodiment of "second controller".

It is noted that when commutation command CM is input from intermittent controller 18, converter controller 13 controls a firing phase of converter 1 such that DC current Id becomes zero for a predetermined pause time Δt from the point of time when commutation command CM (one-shot pulse) rises to H (logic high) level. Pause time Δt is set to a time required for extinguishing the thyristors of inverter 2.

Specifically, converter controller 13 includes a speed controller 14, a current controller 15, a control angle calculator 16, and a gate pulse generator 17. Speed controller 14 calculates the rotation speed of synchronous machine 20, based on the detected position of the rotor of synchronous machine 20. Speed controller 14 generates current command value Id* that is a target value of DC current Id, based on the calculated rotation speed.

Current controller 15 performs control calculation for causing DC current Id # to follow current command value Id* and generates voltage command value VDC1*. For example, current controller 15 generates voltage command value VDC1* by calculating a deviation ΔId between current command value Id* and DC current Id # and performing proportional integral (PI) calculation of the calculated deviation ΔId. Current controller 15 may be configured to perform proportional integral differential (PID) calculation.

Voltage command value VDC1* is equivalent to a control command that defines DC voltage VDC1 that converter 1 should output. Converter 1 performs control such that DC voltage VDC1 is larger than DC voltage VDC2 on the input terminal 2a, 2b side of inverter 2 by the amount of voltage drop by DC reactor 3. DC current Id is thus controlled.

Control angle calculator 16 controls phase control angle α, based on voltage command value VDC1* applied from current controller 15. Control angle calculator 16 applies the calculated phase control angle α to gate pulse generator 17. When commutation command CM is input from intermittent controller 18, control angle calculator 16 narrows phase control angle α such that DC current Id becomes zero for pause time Δt.

Gate pulse generator 17 generates a gate pulse (firing command) to be applied to the gate of a thyristor of converter 1, based on phase control angle α received from control angle calculator 16. The switching of converter 1 is controlled in accordance with the gate pulse generated by gate pulse generator 17, whereby DC current Id in accordance with current command value Id* is output from converter 1.

Figure 2:
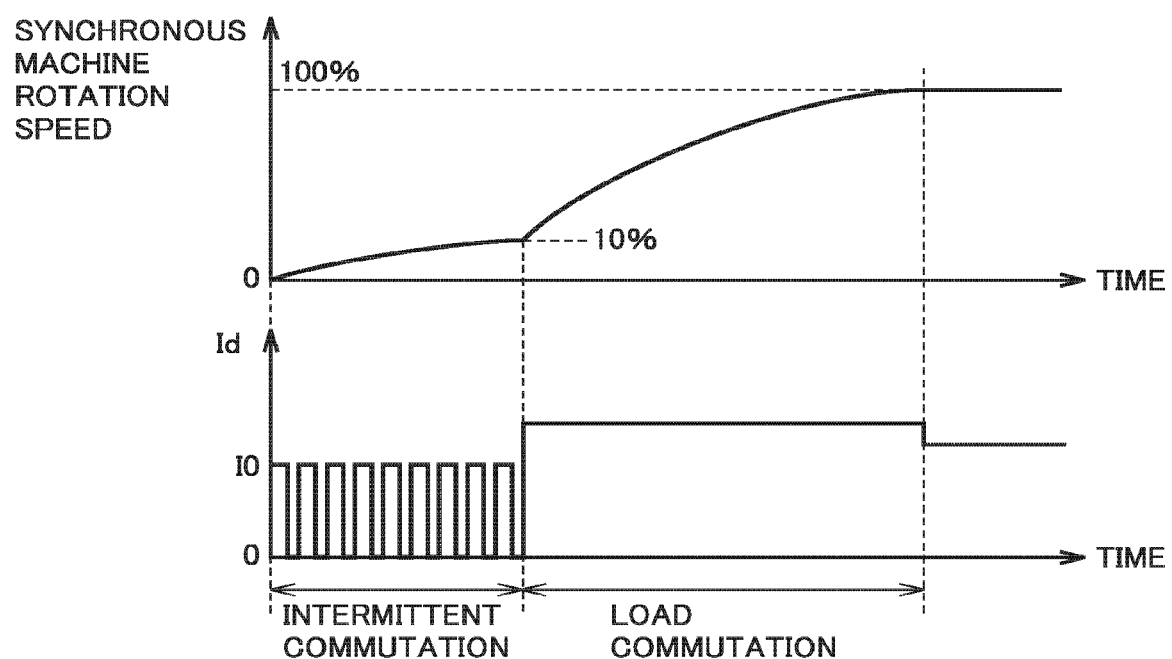
FIG. 2 is a time chart showing the operation of the thyristor starter.

Referring now to FIG. 2, the operation of thyristor starter 100 will be described.

FIG. 2 is a time chart showing the operation of thyristor starter 100. FIG. 2 shows DC current Id output from converter 1 and the rotation speed of synchronous machine 20.

In thyristor starter 100, commutation of the thyristors in inverter 2 is performed using counter-electromotive force (induced voltage) induced in armature windings ATU, ATV, ATW of synchronous machine 20. Such commutation is called "load commutation".

However, when the rotation speed of synchronous machine 20 is low, that is, at startup or at a low speed of synchronous machine 20, the induced voltage produced in armature windings ATU, ATV, ATW is low and therefore commutation of the thyristors may fail. For this reason, when the rotation speed of synchronous machine 20 is low, "intermittent commutation" is employed in which commutation of inverter 2 is performed by intermittently setting DC current Id output from converter 1 to zero.

As shown in FIG. 2, thyristor starter 100 successively switches and performs the intermittent commutation mode (first mode) and the load commutation mode (second mode) so that synchronous machine 20 is accelerated from the stop state to the rated rotation speed.

Specifically, at time t=0, synchronous machine 20 in the stop state is started, and then thyristor starter 100 performs the intermittent commutation mode. In the intermittent commutation mode, DC current Id exhibits a pulse waveform. In the example in FIG. 2, the peak value of each pulse is set to a constant value (Id=I0). The peak value is set, for example, such that the integrated value of AC power supplied to synchronous machine 20 during the intermittent commutation mode satisfies the amount of electric power for accelerating synchronous machine 20 in the stop state to the switching rotation speed.

Then, when the rotation speed of synchronous machine 20 reaches about 10% of the rated rotation speed, thyristor starter 100 switches from the intermittent commutation mode to the load commutation mode. In the following description, the rotation speed at which the intermittent commutation mode switches to the load commutation mode may be referred to as "switching rotation speed". In the example in FIG. 2, the switching rotation speed is about 10% of the rated rotation speed.

Figure 3:
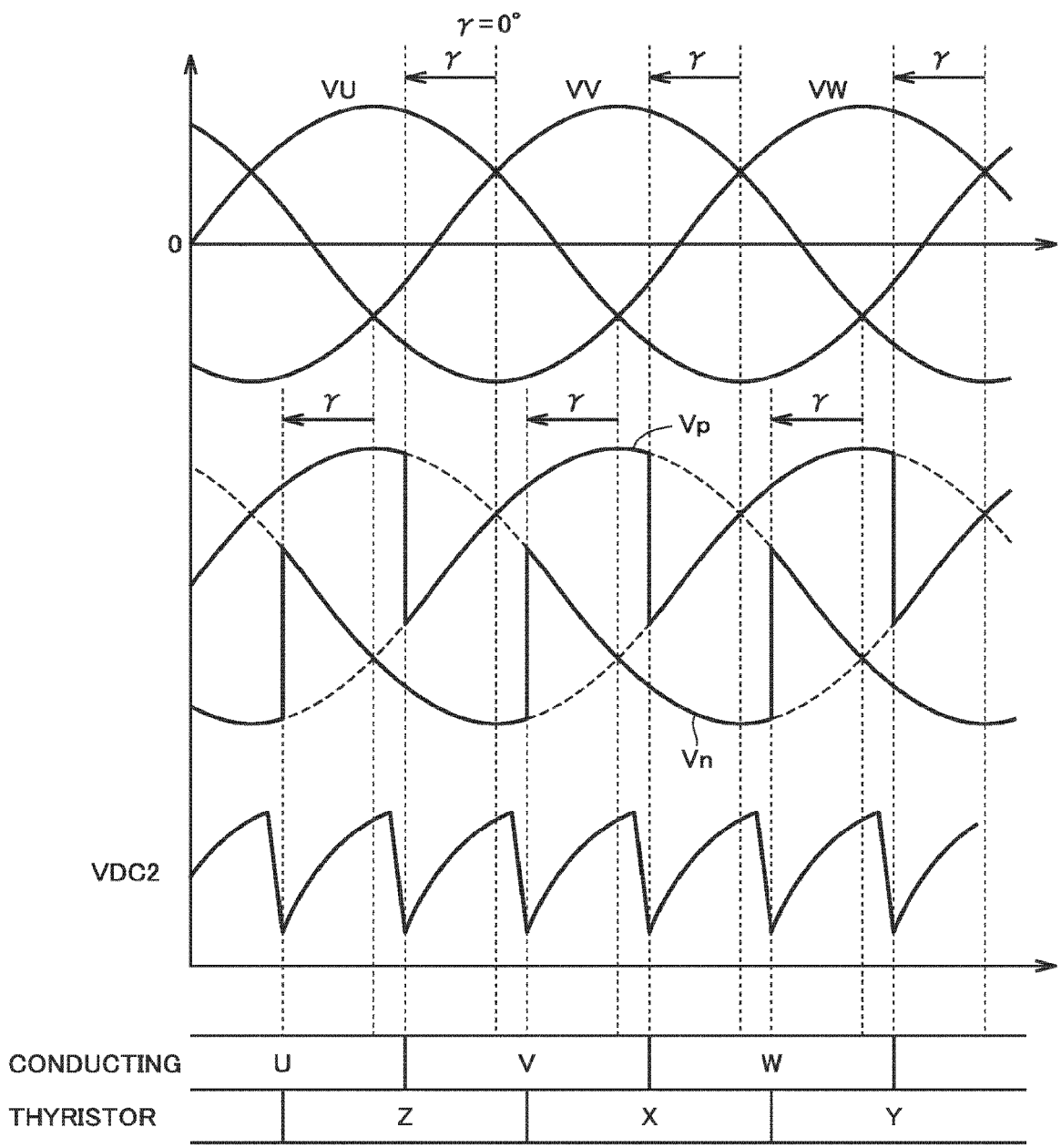
FIG. 3 is a time chart schematically showing a commutation operation of an inverter in a load commutation mode.

FIG. 3 is a time chart schematically showing the commutation operation of inverter 2 in the load commutation mode. FIG. 3 shows three phase AC voltages VU, VV, VW, conducting thyristors of six thyristors in inverter 2, potential Vp of input terminal 2a of inverter 2, potential Vn of input terminal 2b, and DC voltage VDC2 appearing between input terminals 2a and 2b of inverter 2.

One of thyristors U, V, W and one of thyristors X, Y, Z are rendered conductive in synchronous with three phase AC voltages VU, VV, VW, so that inverter 2 converts DC power supplied from converter 1 through DC reactor 3 into three-phase AC power with a variable frequency and a variable voltage and applies the converted AC power to the stator (armature windings ATU, ATV, ATW) of synchronous machine 20. This can increase the rotation speed of synchronous machine 20.

In FIG. 3, the point at which line voltages VU-VV, VV-VW, VW-VU are 0 V is the reference point of phase control angle γ, and at the reference point, γ=0°. In the load commutation mode, a gate pulse is applied to the thyristors at a time ahead in phase by a predetermined angle γ from the reference point. For example, a gate pulse is applied to thyristor V during a period in which thyristor U is conducting, and then a gate pulse is applied to thyristor W during a period in which thyristor V is conducting. Similarly, a gate pulse is applied to thyristor X during a period in which thyristor Z is conducting, and then a gate pulse is applied to thyristor Y during a period in which thyristor X is conducting.

In accordance with transition of the conducting thyristors, line voltages VU-VV, VV-VW, VW-VU of synchronous machine 20 successively appear as DC voltage VDC2 between input terminals 2a and 2b of inverter 2. Inverter controller 10 fires six thyristors U, V, W, X, Y, Z two by two in order in accordance with rotation of synchronous machine 20 to control the path of current flowing through synchronous machine 20.

Figure 4:
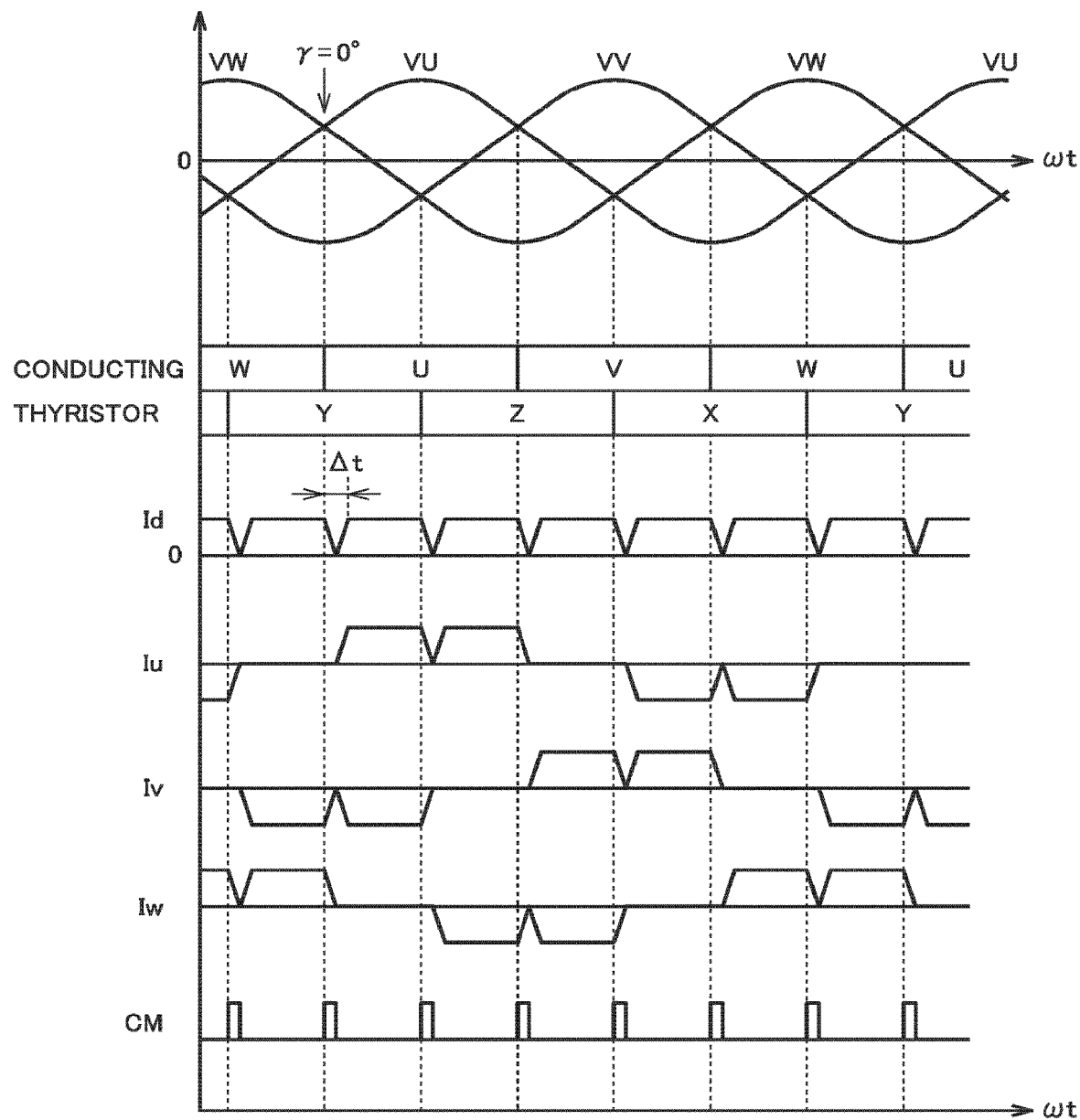
FIG. 4 is a time chart schematically showing a commutation operation of an inverter in an intermittent commutation mode.

FIG. 4 is a time chart schematically showing the commutation operation of inverter 2 in the intermittent commutation mode. FIG. 4 shows three phase AC voltages VU, VV, VW, conducting thyristors of six thyristors in inverter 2, DC current Id flowing through DC reactor 3, currents Iu, Iv, Iw flowing through synchronous machine 20, and commutation command CM.

In FIG. 4, in a three-phase bridge inverter, the reference point appears every rotation position (electrical angle) 60° of the rotor of synchronous machine 20. When commutation command CM is generated in synchronization with this reference point, converter controller 13 switches phase control angle α of converter 1 such that DC current Id becomes zero for pause time Δt from the point of time when commutation command CM rises to H level. For this pause time Δt, all the thyristors in inverter 2 are turned off and commutation operation is performed.

After pause time Δt has passed, inverter controller 10 applies a gate pulse to two necessary thyristors again to fire the two thyristors. At the same time, converter controller 13 applies a gate pulse to the gates of the thyristors in converter 1, in accordance with phase control angle α based on voltage command value VDC1*. DC current Id then starts flowing again.

Figure 5:
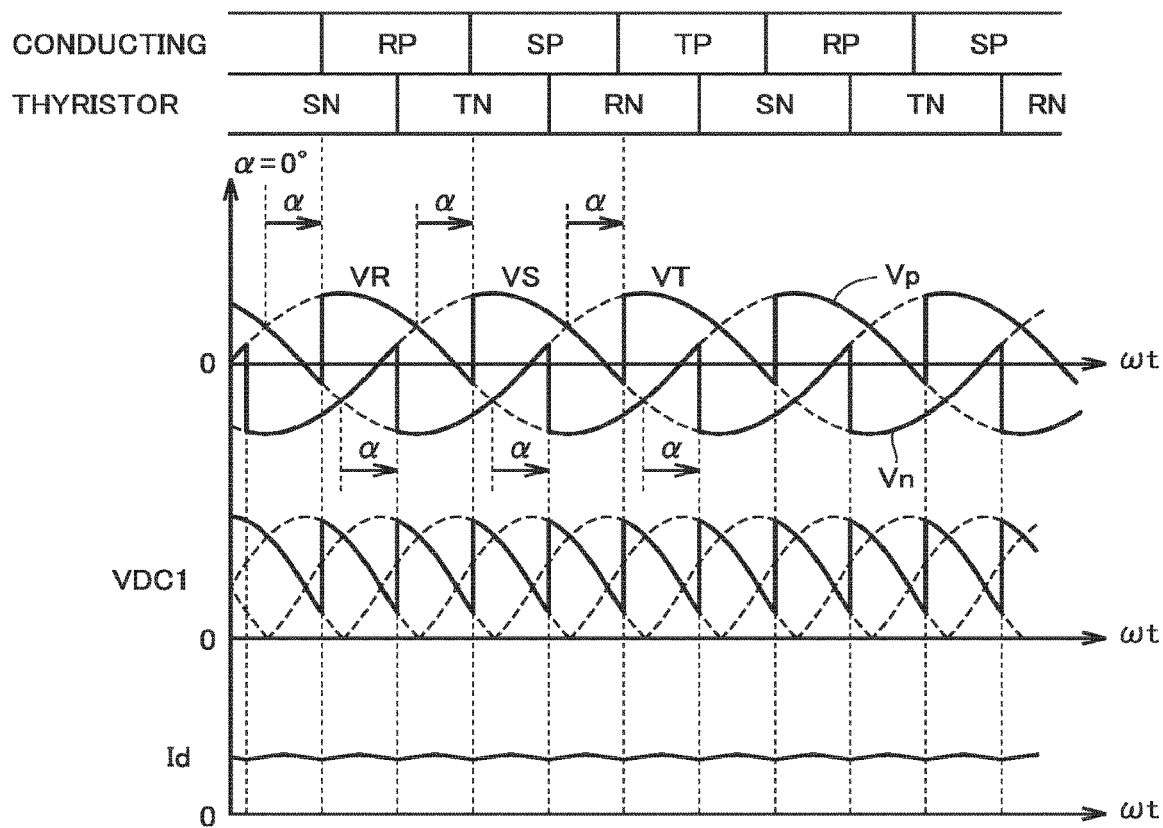
FIG. 5 is a time chart schematically showing a commutation operation of a converter.

FIG. 5 is a time chart schematically showing the commutation operation of converter 1. FIG. 5 shows three phase AC voltages VR, VS, VT, conducting thyristors of six thyristors in converter 1, potential Vp of positive-side output terminal 1a of converter 1, potential Vn of negative-side output terminal 1b, DC voltage VDC1 appearing between output terminals 1a and 1b of converter 1, and DC current Id flowing through DC reactor 3.

In FIG. 5, the point at which line voltages VR-VS, VS-VT, VT-VR are 0 V is the reference point of phase control angle α, and at the reference point, α=0°. A gate pulse is applied to the thyristors at a time behind in phase by a desired angle α from the reference point. For example, a gate pulse is applied to thyristor SP during a period in which thyristor RP is conducting, and then a gate pulse is applied to thyristor TP during a period in which thyristor SP is conducting. Similarly, a gate pulse is applied to thyristor RN during a period in which thyristor TN is conducting, and then a gate pulse is applied to thyristor SN during a period in which thyristor RN is conducting.

In accordance with transition of the conducting thyristors, line voltages VR-VS, VS-VT, VT-VR of three-phase AC voltage supplied from AC power supply 30 successively appear as DC voltage VDC1 between output terminals 1a and 1b of converter 1. When the effective value of line voltage of three-phase AC voltage supplied to converter 1 is Vs, average value VDC1 # of DC voltage VDC1 output from converter 1 is given by Equation (1) below, where an overlap angle is ignored.

$$VDC1\ \#=1.35Vs\cos\alpha \qquad (1)$$

Converter controller 13 substitutes voltage command value VDC1* to VDC1 # in Equation (1) to calculate phase control angle α. Converter controller 13 fires six thyristors RP, SP, TP, RN, SN, TN two by two in order to control DC current Id flowing through DC reactor 3.

In the intermittent commutation mode, as shown in FIG. 4, every time commutation command CM is generated, converter controller 13 switches phase control angle α such that DC current Id flowing through DC reactor 3 becomes zero for pause time Δt. Specifically, converter controller 13 lowers DC voltage VDC1 to a value lower than voltage command value VDC1* by switching phase control angle α based on voltage command value VDC1* to a larger phase control angle αs (for example, αs=120°).

In this way, converter controller 13 is configured to narrow DC current Id to zero every commutation timing of inverter 2 by controlling the firing phase of converter 1. In the following, first, referring to FIG. 6 and FIG. 7, the control and the problem of converter 1 in the intermittent commutation mode in a thyristor starter according to a comparative example will be described. Then, control of converter 1 in the intermittent commutation mode by converter controller 13 of thyristor starter 100 according to the present embodiment will be described.

Figure 6:
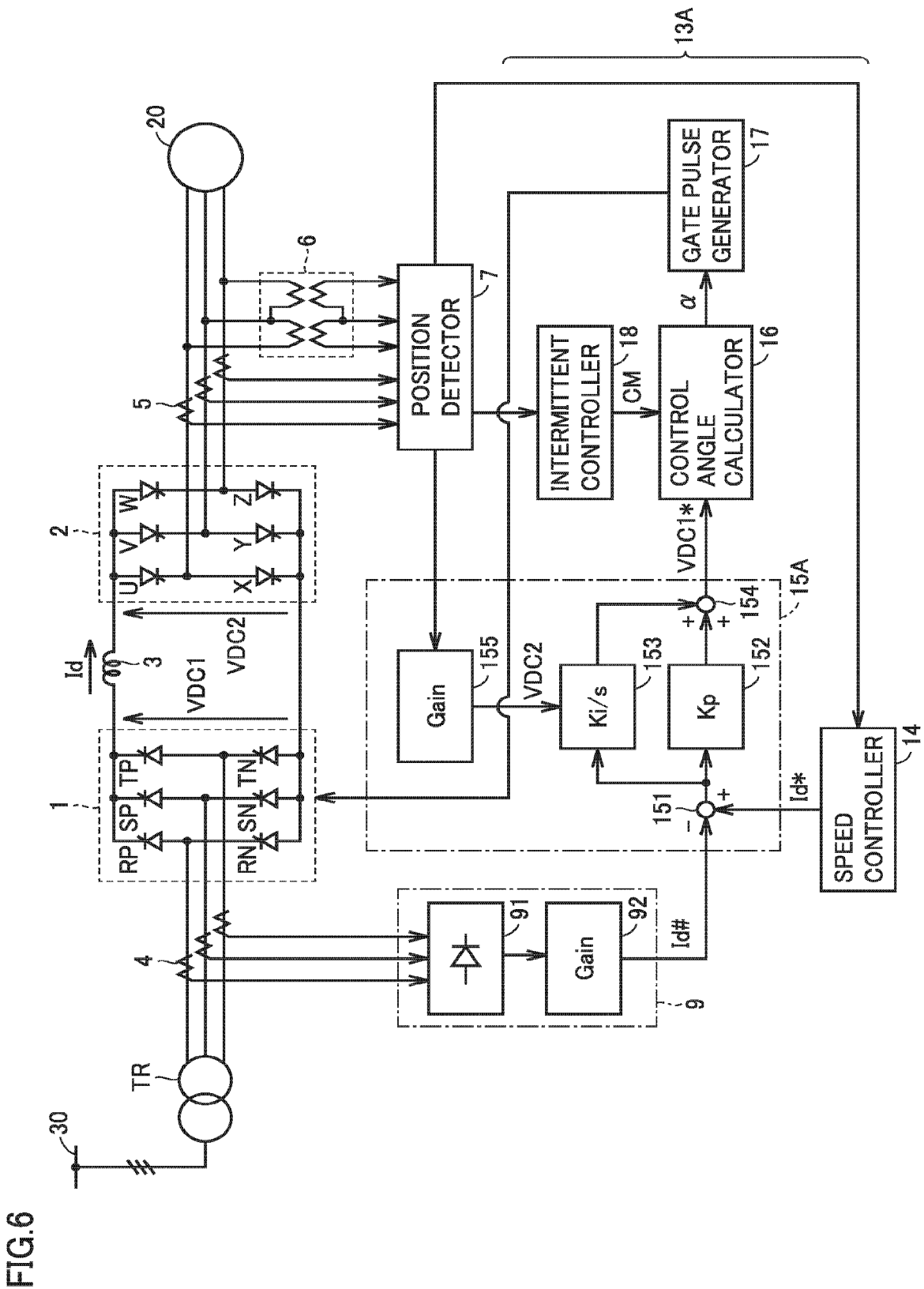
FIG. 6 is a block diagram illustrating a converter controller included in a thyristor starter according to a comparative example.

FIG. 6 is a block diagram illustrating a converter controller 13A included in a thyristor starter according to a comparative example. The configuration of the thyristor starter according to a comparative example is the same as the configuration of thyristor starter 100 shown in FIG. 1 except for converter controller 13A and will not be further elaborated here.

Referring to FIG. 6, converter controller 13A according to a comparative example includes a speed controller 14, a current controller 15A, a control angle calculator 16, and a gate pulse generator 17.

Speed controller 14 calculates the rotation speed of synchronous machine 20, based on the position of the rotor of synchronous machine 20 detected by position detector 7. Speed controller 14 generates current command value Id* that is a target value of DC current Id, based on the calculated rotation speed.

Current detector 9 includes a rectifier 91 and a gain multiplier 92. Rectifier 91 includes a full-wave rectifying diode rectifier and converts three-phase AC current detected by current transformer 4 into DC current. Gain multiplier 92 multiplies DC current from rectifier 91 by gain K1. The value Id # obtained by multiplying DC current by gain K1 is proportional to DC current Id flowing through DC reactor 3. Converter controller 13A controls a firing phase of converter 1 such that DC current Id # matches current command value Id*, whereby DC current Id in accordance with current command value Id* can be output from converter 1.

Specifically, current controller 15A generates voltage command value VDC1* by performing control calculation (PI calculation) of deviation ΔId between current command value Id* and DC current Id #. Specifically, current controller 15A includes a subtracter 151, a proportional unit 152, an integrator 153, an adder 154, and a gain multiplier 155. Proportional unit 152 corresponds to "proportional element" in control calculation, and integrator 153 corresponds to "integral element" in control calculation.

Subtracter 151 calculates deviation ΔId of DC current Id # from current command value Id* by subtracting DC current Id # detected by current detector 9 from current command value Id*.

Proportional unit 152 (proportional element) outputs a value obtained by multiplying deviation ΔId received from subtracter 151 by a predetermined proportional gain Kp as a proportional term to adder 154. Integrator 153 (integral element) outputs a value obtained by multiplying a time integral value of deviation ΔId by a predetermined integral gain Ki as an integral term to adder 154.

Adder 154 adds the proportional term and the integral term to generate voltage command value VDC1*. The proportional integral calculation by current controller 15A is given by, for example, Equation (2) below.

$$VDC1^* = Kp \cdot \Delta Id + Ki \cdot \Sigma(\Delta Id) \quad (2)$$

In Equation (2), Kp·ΔId is a proportional term, and Ki·Σ(ΔId) is an integral term.

Control angle calculator 16 calculates phase control angle α based on voltage command value VDC1* generated by current controller 15A and applies the calculated phase control angle α to gate pulse generator 17. However, when commutation command CM is applied from intermittent controller 18, control angle calculator 16 applies phase control angle αs (for example, αs=120°) to gate pulse generator 17, instead of phase control angle α based on voltage command value VDC1*, for pause period Δt.

Gate pulse generator 17 generates a gate pulse to be applied to the gate of a thyristor of converter 1, based on phase control angle α or as received from control angle calculator 16.

Here, in order to apply acceleration torque to the rotor of synchronous machine 20 immediately after the elapse of pause time Δt in the same manner as immediately before pause time Δ, it is necessary to allow DC current Id supplied to inverter 2 immediately after pause time Δt to follow current command value Id* fast without delay. That is, it is necessary to raise DC current Id from zero to current command value Id* fast immediately after pause time Δt. To do so, it is preferable that immediately after the elapse of pause time Δt, DC voltage VDC1 larger than DC voltage VDC2 between input terminals 2a and 2b of inverter 2 by the amount of voltage drop by a resistance component of DC reactor 3 should be output between output terminals 1a and 1b of converter 1.

Then, in converter controller 13A according to a comparative example, when current controller 15A resumes PI calculation after the elapse of pause time Δt, the integral term in integrator 153 is preset. That is, at a point of time when PI calculation is resumed, the integral term in Equation (2) above is set to a preset value set independently of the integral term output from integrator 153 immediately before pause time Δt. In the comparative example, it is assumed that current controller 15A uses an estimate value of DC voltage VDC2 between input terminals 2a and 2b of inverter 2 as a preset value of the integral term.

Here, if a field is constant, the counter-electromotive force (induced voltage) of synchronous machine 20 increases in proportion to the rotation speed of synchronous machine 20. Therefore, DC voltage VDC2 can be estimated based on the rotation speed of synchronous machine 20 obtained from a signal from position detector 7. In current controller 15A, gain multiplier 155 calculates the rotation speed of synchronous machine 20, based on the position of the rotor of synchronous machine 20 detected by position detector 7, and multiplies the calculated rotation speed by gain K2. The value obtained by multiplying the rotation speed by gain K2 is proportional to DC voltage VDC2 appearing between the input terminals of inverter 2. Gain multiplier 155 outputs the estimate value of DC voltage VDC2 to integrator 153. Integrator 153 presets the estimate value of DC voltage VDC2 in the integral term, immediately after pause time Δt.

With this configuration, voltage command value VDC1* immediately after pause time Δt is a value obtained by adding the proportional term obtained by multiplying deviation ΔId by proportional gain Kp to the estimate value of DC voltage VDC2 according to Equation (2) above. The firing phase of converter 1 is controlled in accordance with this voltage command value VDC1*, whereby, ideally, immediately after pause time Δt, converter 1 can output DC voltage VDC1 larger than DC voltage VDC2 by the proportional term. Accordingly, immediately after pause time Δt, DC current Id can follow current command value Id* fast without delay.

Figure 7:
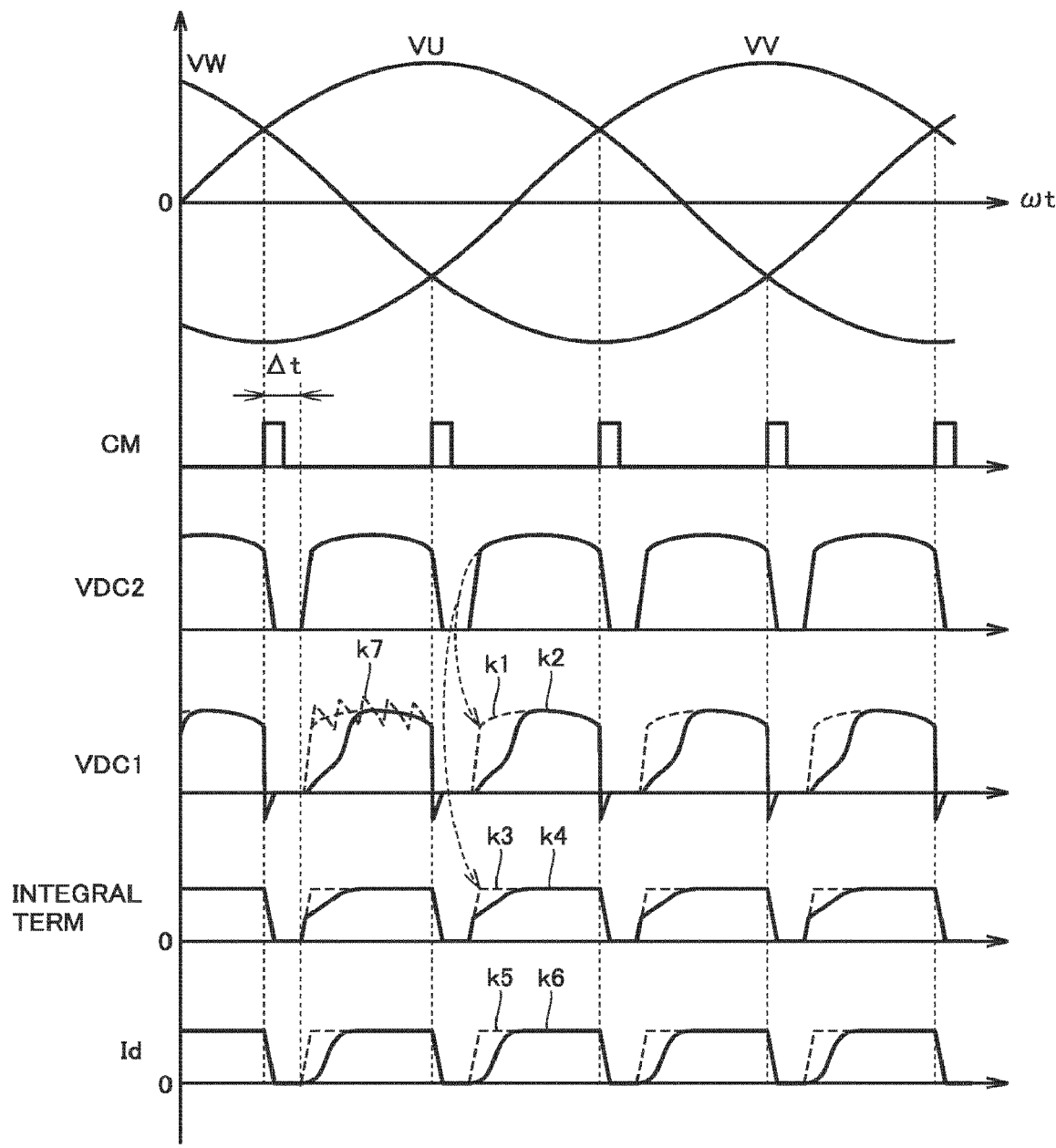
FIG. 7 is a time chart illustrating control of converter 1 in the intermittent commutation mode by the converter controller according to a comparative example.

FIG. 7 is a time chart illustrating control of converter 1 in the intermittent commutation mode by converter controller 13A according to a comparative example. FIG. 7 shows three phase AC voltages VU, VV, VW, commutation command CM, DC voltage VDC2 appearing between the input terminals of inverter 2, DC voltage VDC1 appearing between the output terminals of converter 1, the integral term in current controller 15A, and DC current Id flowing through DC reactor 3. For each of DC voltage VDC1, the integral term, and DC current Id, a waveform based on an ideal value is indicated by a broken line, and a waveform based on the actual value is indicated by a solid line.

As shown in FIG. 7, the integral term in integrator 153 is reset to zero at the point of time when commutation command CM is generated. Then, immediately after pause time Δt, the integral term is preset to the estimate value of DC voltage VDC2 obtained from the rotation speed of synchronous machine 20.

Here, when the estimate value of DC voltage VDC2 matches DC voltage VDC2 actually appearing between the input terminals of inverter 2, the integral term attains an ideal value indicated by broken line k3 in the figure. That is, the integral term steeply increases from zero to the actual DC voltage VDC2 and thereafter gradually changes in accordance with deviation ΔId.

When the integral term increases like the waveform indicated by broken line k3 immediately after pause time Δt, voltage command value VDC1* that is the sum of the integral term and the proportional term also steeply increases. Therefore, DC voltage VDC1 appearing between the output terminals of converter 1 immediately after pause time Δt steeply increases like the waveform indicated by broken line k1 in the figure. Since DC voltage VDC1 steeply increases, DC current Id flowing through DC reactor 3 can steeply rise from zero as indicated by broken line k5 and follow current command value Id* fast.

However, contrary to the ideal, an error may occur between the estimate value of DC voltage VDC2 calculated from the rotation speed of synchronous machine 20 and DC voltage VDC2 actually appearing between the input terminals of inverter 2. This error may occur, for example, due to an impedance component of synchronous machine 20 and an error in voltage control in synchronous machine 20.

When the estimate value of DC voltage VDC2 is lower than the actual DC voltage VDC2, the integral term exhibits the waveform indicated by solid line k4 in the figure. When preset to a value lower than the actual DC voltage VDC2 immediately after pause time Δt, the integral term gradually increases from the preset value in accordance with deviation ΔId.

With the preset value of the integral term becoming lower than the ideal value, voltage command value VDC1* also becomes lower than the ideal value, so that DC voltage VDC1 between output terminals 1a and 1b of converter 1 gradually increases from a value lower than the ideal value, like the waveform indicated by solid line k2 in the figure. Since DC voltage VDC1 becomes lower than the ideal value, the rising of DC current Id becomes slow as indicated by solid line k6 in the figure immediately after pause time Δt, and DC current Id is unable to follow current command value Id* fast.

In this way, when the target following characteristic of DC current Id decreases, the acceleration torque of synchronous machine 20 may temporarily decrease immediately after pause time Δt. Thus, the torque of synchronous machine 20 fluctuates every time commutation command CM is generated, and consequently, the speed control of synchronous machine 20 in the intermittent commutation mode may become unstable. Moreover, since the speed-up rate of synchronous machine 20 is reduced, it may take time to start synchronous machine 20.

In this way, in converter controller 13A according to a comparative example, since the preset value of the integral term in PI calculation immediately after pause time Δt is set to the estimate value of DC voltage VDC2 based on the rotation speed of synchronous machine 20, DC current Id may fail to follow current command value Id* fast immediately after pause time Δt, because of an error included in the estimate value of DC voltage VDC2.

Then, in thyristor starter 100 according to the present first embodiment, when PI calculation is resumed immediately after the pause time, the control amount calculated in PI calculation immediately before the pause time is used as a preset value of the integral element immediately after the pause time.

Specifically, current controller 15 uses the integral term calculated in PI calculation immediately before pause time Δt, as a preset value of the integral term immediately after the pause time. With this configuration, in the integrator of current controller 15, the integral term calculated immediately before pause time Δt is inherited as the preset value of the integral term immediately after pause time Δt.

Figure 8:
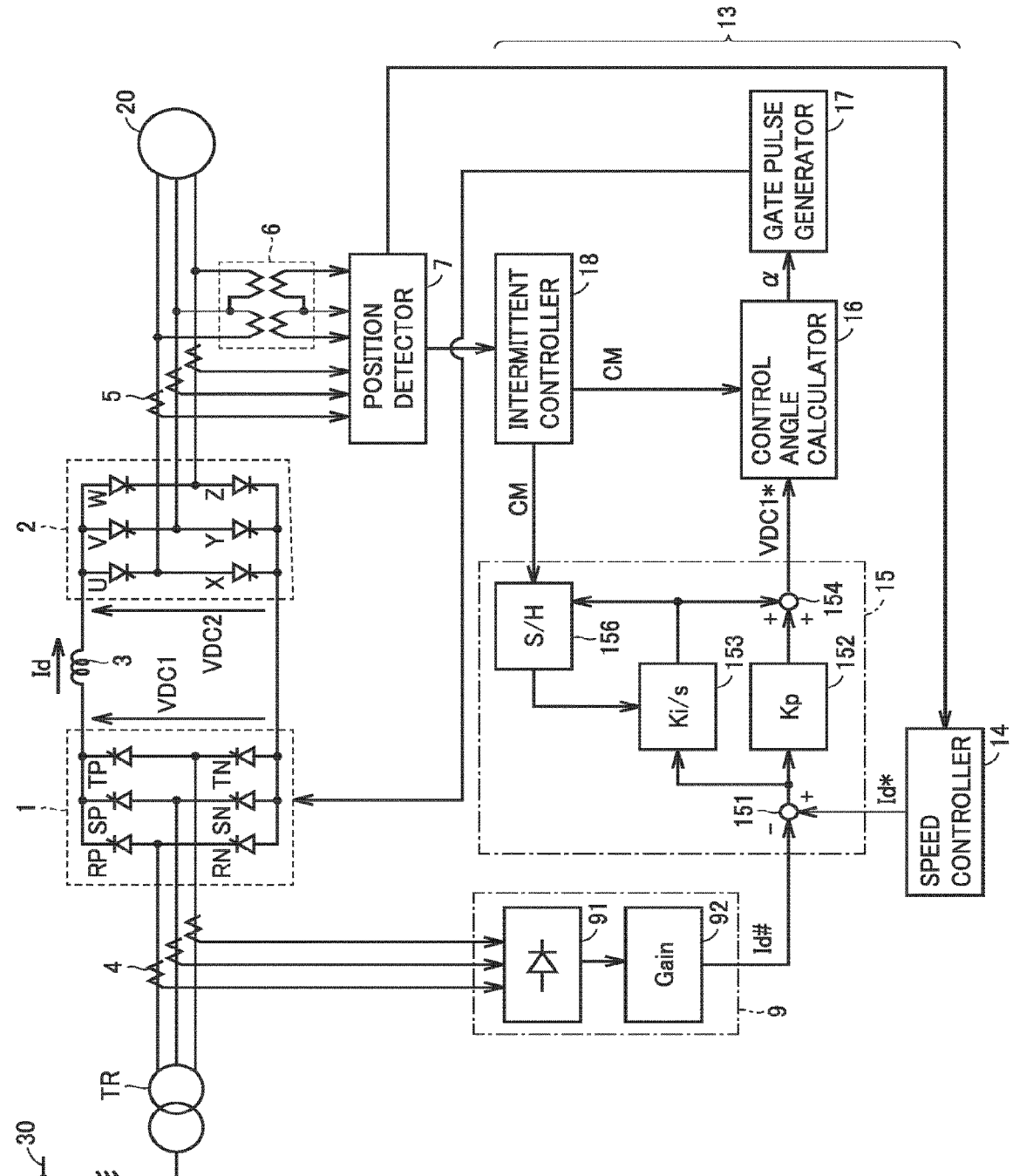
FIG. 8 is a functional block diagram showing a configuration of a converter controller included in the thyristor starter according to the present first embodiment.
Figure 9:
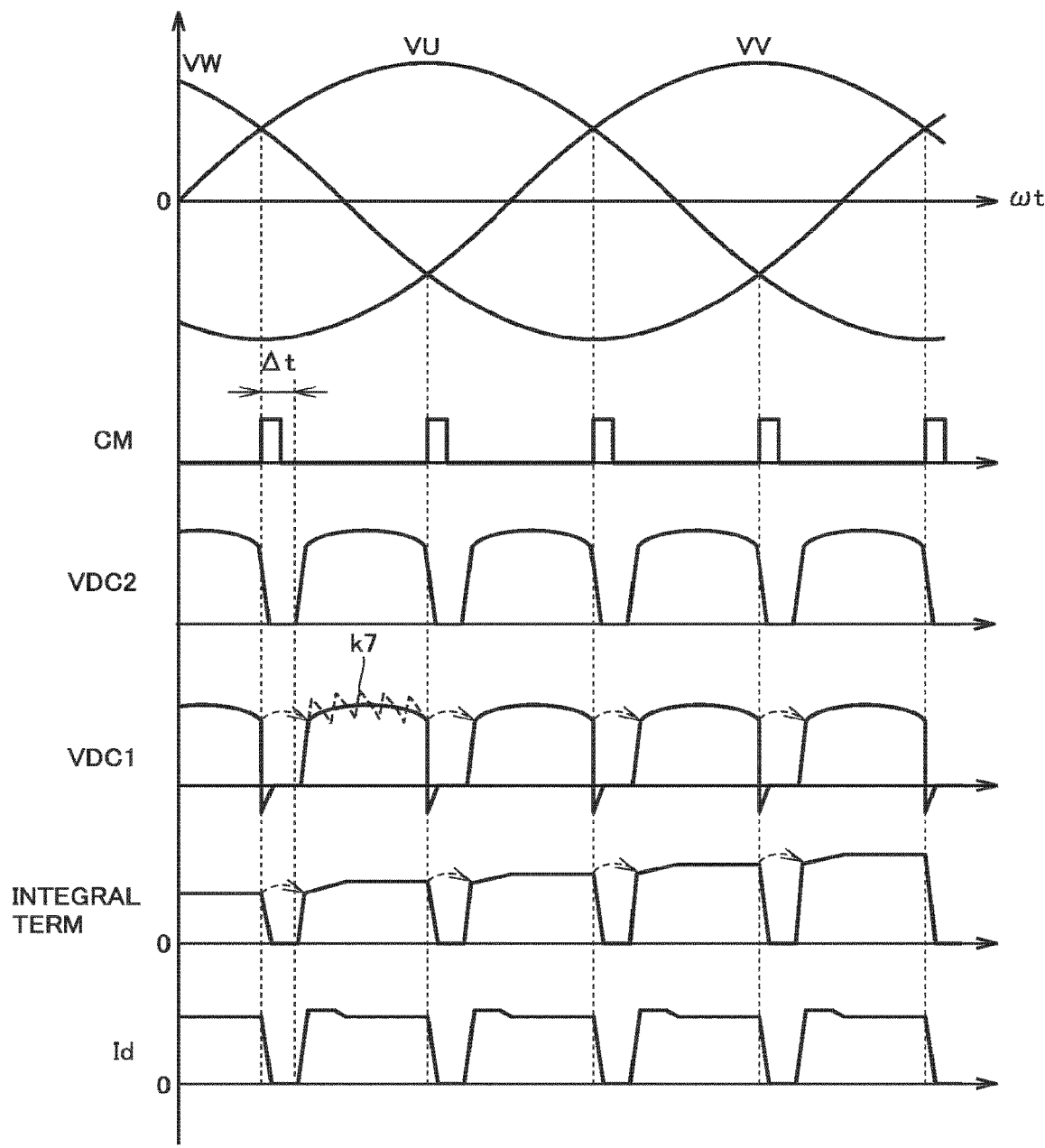
FIG. 9 is a time chart illustrating control of the converter in the intermittent commutation mode by the converter controller according to the present first embodiment.

Referring now to FIG. 8 and FIG. 9, the control of converter 1 in thyristor starter 100 according to the present first embodiment will be described.

FIG. 8 is a functional block diagram showing a configuration of converter controller 13 included in thyristor starter 100 according to the present first embodiment.

Referring to FIG. 8, converter controller 13 according to the present first embodiment differs from converter controller 13A according to a comparative example shown in FIG. 6 in that it includes current controller 15 instead of current controller 15A. The configuration of other portions in FIG. 8 is the same as in FIG. 6 and will not be further elaborated here.

Current controller 15 generates voltage command value VDC1* by performing control calculation (PI calculation) of deviation ΔId between current command value Id* and DC current Id #. Current controller 15 includes a subtracter 151, a comparator 152, an integrator 153, an adder 154, and a sample and hold (S/H) circuit 156. Current controller 15 differs from current controller 15A shown in FIG. 6 in that it includes sample and hold circuit 156 instead of gain multiplier 155.

Sample and hold circuit 156 takes in and holds the integral term of integrator 153 when commutation command CM output from intermittent controller 18 changes from L level to H level. The held integral term corresponds to the integral term calculated immediately before pause time Δt. Sample and hold circuit 156 outputs the held integral term to integrator 153 as the preset value of the integral term immediately after pause time Δt. Thus, immediately after pause time Δt, integrator 153 outputs the integral term immediately before pause time Δt applied from sample and hold circuit 156, as the integral term.

FIG. 9 is a time chart illustrating control of converter 1 in the intermittent commutation mode by converter controller 13 according to the present first embodiment. FIG. 9 shows three phase AC voltages VU, VV, VW, commutation command CM, DC voltage VDC2 appearing between input terminals 2a and 2b of inverter 2, DC voltage VDC1 appearing between output terminals 1a and 1b of converter 1, the integral term in current controller 15, and DC current Id flowing through DC reactor 3.

As shown in FIG. 9, the integral term in integrator 153 is reset to zero at the point of time when commutation command CM is generated and thereafter is preset immediately after pause time Δt. Here, the integral term immediately before pause time Δt is used as the preset value.

In this way, the integral term in PI calculation is inherited between immediately before and immediately after pause time Δt, whereby immediately after pause time Δt, the integral term steeply increases from zero to a value equal to the integral term immediately before pause time Δt.

Since the integral term steeply increases immediately after pause time Δt, voltage command value VDC1* that is the sum of the integral term and the proportional term also steeply increases. Therefore, DC voltage VDC1 appearing between the output terminals of converter 1 immediately after pause time Δt steeply increases. DC voltage VDC1 appearing between the output terminals of converter 1 ripples as indicated by broken line k7 and is smoothed by DC reactor 3. Since DC voltage VDC1 steeply increases, DC current Id flowing through DC reactor 3 can be increased steeply from zero to equivalent to current command value Id*.

As described above, in converter controller 13 according to the present first embodiment, since the integral term immediately before pause time Δt is used as the preset value of the integral term in PI calculation immediately after pause time Δt, slow rising of DC current Id immediately after pause time Δt due to an error in the estimate value of DC voltage VDC2 can be prevented, unlike the comparative example using the estimate value of DC voltage VDC2 as the preset value. Thus, DC current Id can follow current command value Id* fast immediately after pause time Δt, thereby improving the stability in speed control of synchronous machine 20 in the intermittent commutation mode.

(Modification)

In FIG. 8 and FIG. 9 described above, the integral term immediately after pause time Δt is preset using the integral term calculated immediately before pause time Δt as the control amount obtained in the control calculation immediately before pause time Δt. However, voltage command value VDC1* generated immediately before pause time Δt may be used as a preset value.

Figure 10:
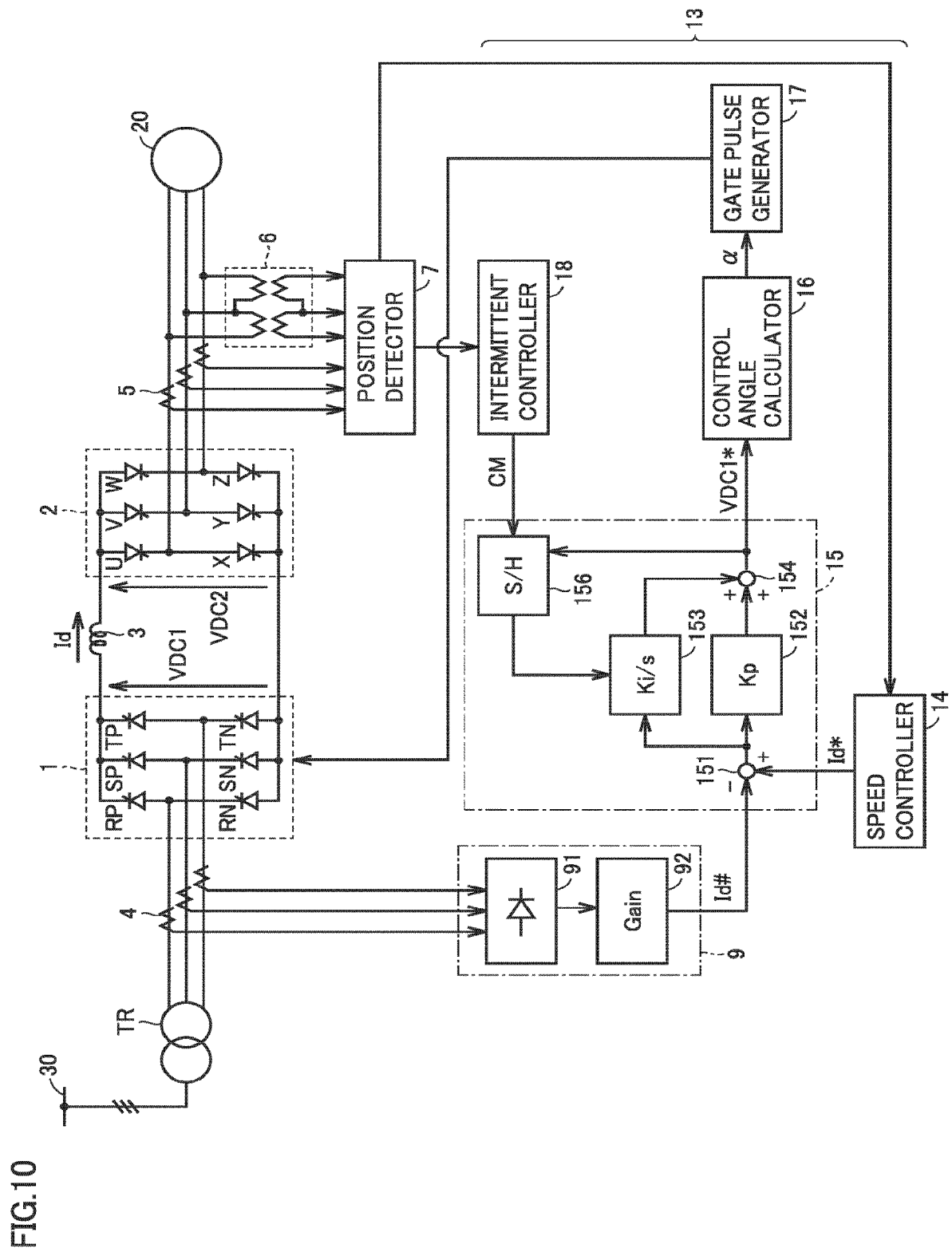
FIG. 10 is a functional block diagram showing a configuration of a converter controller included in the thyristor starter according to a modification to the present first embodiment.
Figure 11:
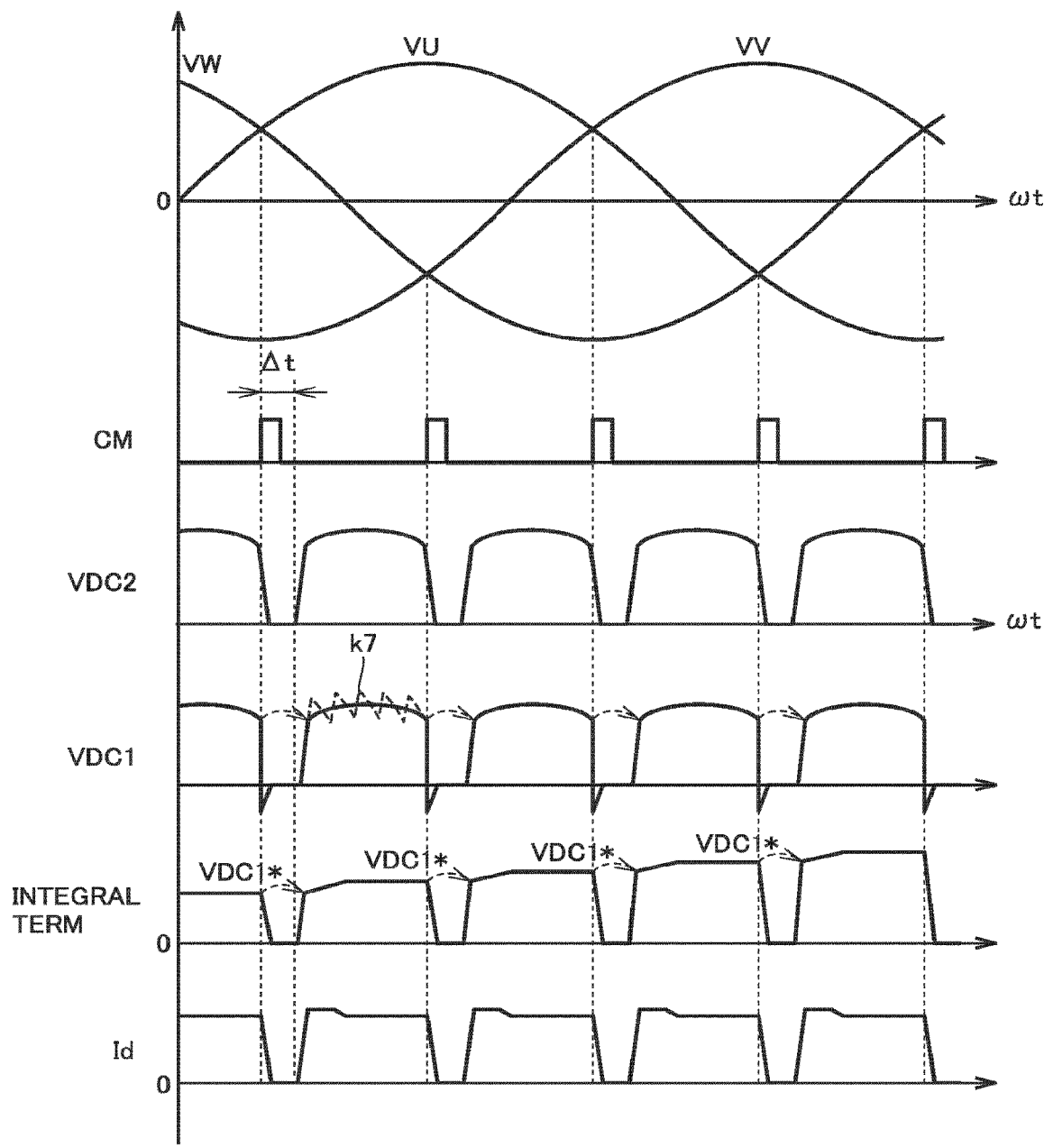
FIG. 11 is a time chart illustrating control of converter 1 in the intermittent commutation mode by the converter controller according to the modification to the present first embodiment.

Referring to FIG. 10 and FIG. 11, the control of converter 1 in thyristor starter 100 according to a modification to the present first embodiment will be described.

FIG. 10 is a functional block diagram showing a configuration of converter controller 13 included in thyristor starter 100 according to a modification to the present first embodiment.

Referring to FIG. 10, converter controller 13 according to the present modification has the same basic configuration as converter controller 13 shown in FIG. 8 but differs in the operation of sample and hold circuit 156 in current controller 15.

In the present modification, sample and hold circuit 156 takes in and holds voltage command value VDC1* output from adder 154 when commutation command CM output from intermittent controller 18 changes from L level to H level. The held voltage command value VDC1* corresponds to voltage command value VDC1* calculated immediately before pause time Δt. Sample and hold circuit 156 outputs the held voltage command value VDC1* to integrator 153 as the preset value of the integral term immediately after pause time Δt. Thus, immediately after pause time Δt, integrator 153 outputs voltage command value VDC1* immediately before pause time Δt applied from sample and hold circuit 156, as the integral term.

FIG. 11 is a time chart illustrating control of converter 1 in the intermittent commutation mode by converter controller 13 according to the modification to the present first embodiment. FIG. 11 shows three phase AC voltages VU, VV, VW, commutation command CM, DC voltage VDC2 appearing between input terminals 2a and 2b of inverter 2, DC voltage VDC1 appearing between output terminals 1a and 1b of converter 1, the integral term in current controller 15, and DC current Id flowing through DC reactor 3.

As shown in FIG. 11, the integral term in integrator 153 is reset to zero at the point of time when commutation command CM is generated and thereafter, immediately after pause time Δt, is preset to voltage command value VDC1* calculated immediately before pause time Δt. That is, immediately after pause time Δt, voltage command value VDC1* immediately before pause time Δt* is used as the preset value of the integral term.

In this way, voltage command value VDC1* generated by PI calculation is inherited between immediately before and immediately after pause time Δt, whereby immediately after pause time Δt, the integral term steeply increases from zero to a value equal to voltage command value VDC1* immediately before pause time Δt. Thus, DC voltage VDC1 appearing between output terminals 1a and 1b of converter 1 immediately after pause time Δt steeply increases, so that DC current Id flowing through DC reactor 3 can be steeply increased from zero to equivalent to current command value Id*.

As described above, in converter controller 13 according to the modification to the present first embodiment, voltage command value VDC1* generated by PI calculation immediately before pause time Δt is used as the preset value of the integral term in PI calculation immediately after pause time Δt, so that DC current Id can follow current command value Id* fast immediately after pause time Δt. Therefore, the stability in speed control of synchronous machine 20 in the intermittent mode can be improved.

Second Embodiment

In thyristor starter 100 according to the present second embodiment, when PI calculation is resumed immediately after the pause time, the measured value of DC voltage VDC2 input to inverter 2 immediately before the pause time is used as the preset value of the integral element immediately after the pause time.

Specifically, current controller 15 uses DC voltage VDC2 detected by voltage detector 19 (FIG. 12) immediately before pause time Δt, as the preset value of the integral term immediately after the pause time. That is, in the integrator in current controller 15, the measured value of DC voltage VDC2 immediately before pause time Δt is a preset value of the integral term immediately after pause time Δt.

Figure 12:
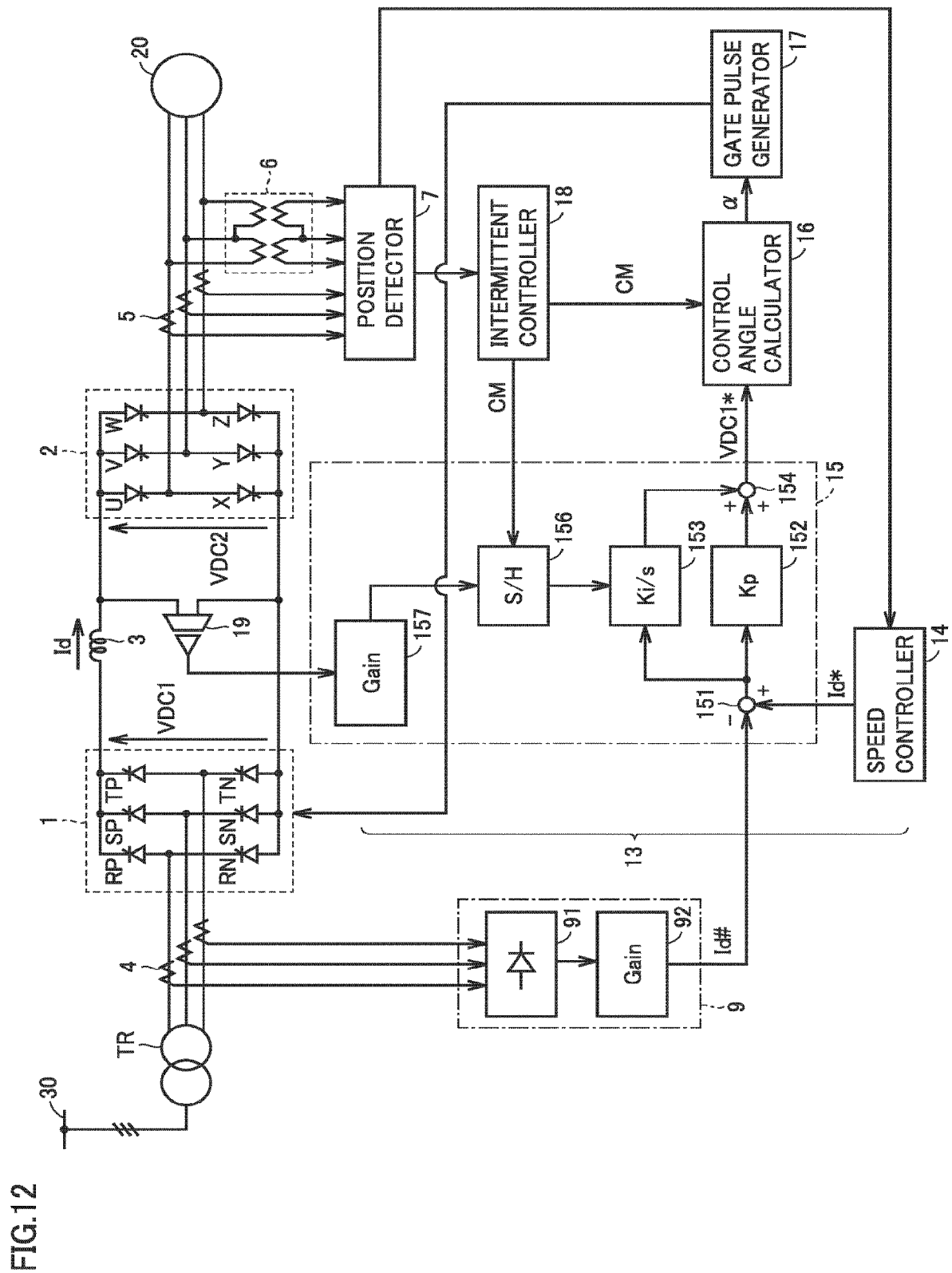
FIG. 12 is a functional block diagram showing a configuration of the converter controller included in the thyristor starter according to the present second embodiment.
Figure 13:
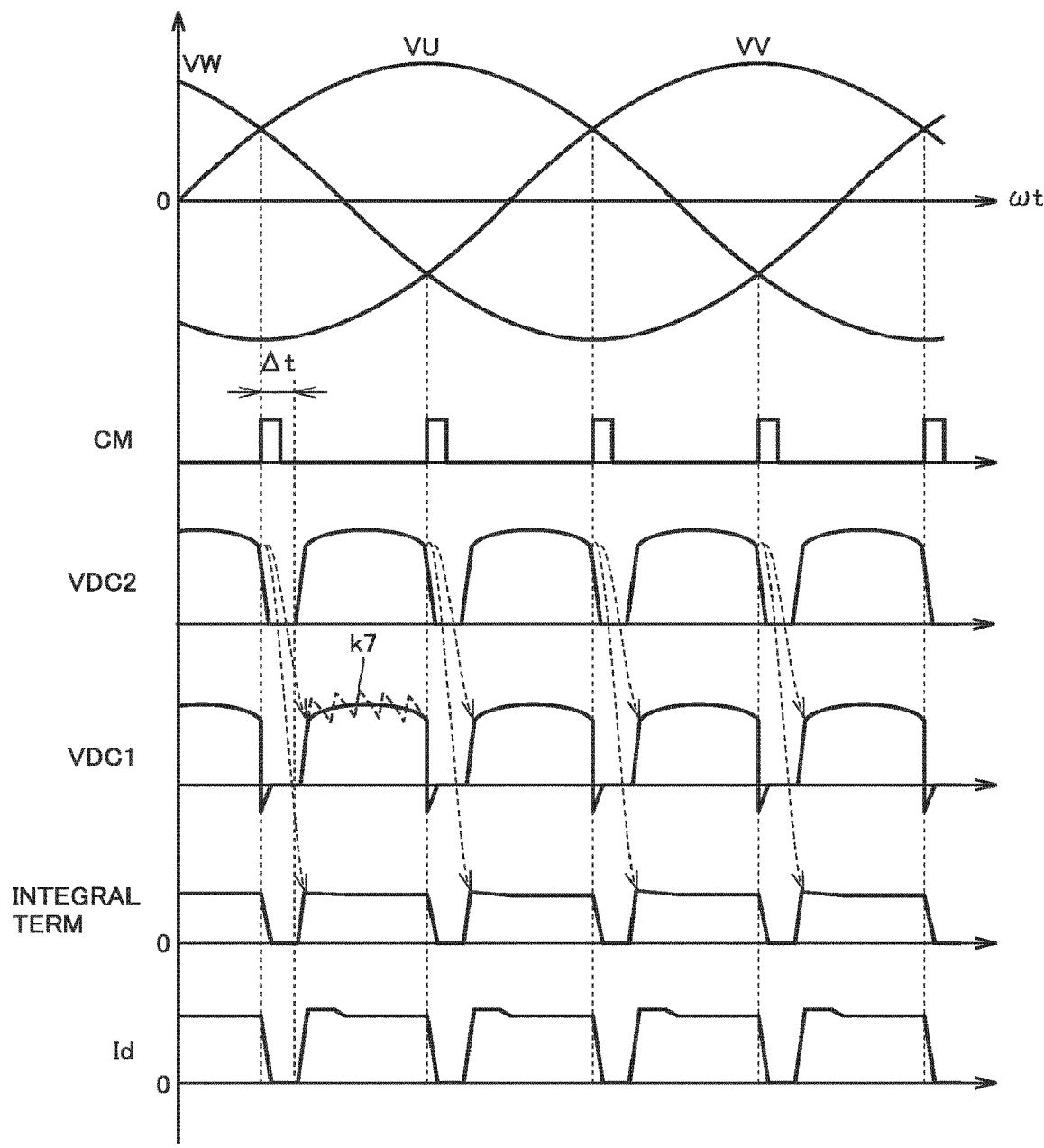
FIG. 13 is a time chart illustrating control of the converter in the intermittent commutation mode by the converter controller according to the present second embodiment.

Referring now to FIG. 12 and FIG. 13, the control of converter 1 in thyristor starter 100 according to the present embodiment will be described.

FIG. 12 is a functional block diagram showing a configuration of converter controller 13 included in thyristor starter 100 according to the present second embodiment.

Referring to FIG. 12, thyristor starter 100 according to the present second embodiment further includes a voltage detector 19. Voltage detector 19 detects DC voltage VDC2 input to inverter 2 and applies a signal indicating the detected value to converter controller 13.

Converter controller 13 according to the present second embodiment differs from converter controller 13A according to a comparative example shown in FIG. 6 in that it includes current controller 15 instead of current controller 15A. The configuration of other portions in FIG. 12 is the same as in FIG. 6 and will not be further elaborated here.

Current controller 15 generates voltage command value VDC1* by performing control calculation (PI calculation) of deviation ΔId between current command value Id* and DC current Id #. Current controller 15 includes a subtracter 151, a comparator 152, an integrator 153, an adder 154, a sample and hold (S/H) circuit 156, and a gain multiplier 157. Current controller 15 differs from current controller 15A shown in FIG. 6 in that it includes sample and hold circuit 156 and gain multiplier 157 instead of gain multiplier 155.

Gain multiplier 157 multiplies a detection signal of voltage detector 19 by gain K2. The value obtained by multiplying a detection signal of voltage detector 19 by gain K2 is proportional to DC voltage VDC2 appearing between the input terminals of inverter 2.

Sample and hold circuit 156 takes in and holds an output signal of gain multiplier 157 when commutation command CM output from intermittent controller 18 changes from L level to H level. The held output signal corresponds to the measured value of DC voltage VDC2 input to inverter 2 immediately before pause time Δt. Sample and hold circuit 156 outputs the held DC voltage VDC2 to integrator 153 as the preset value of the integral term immediately after pause time Δt. Thus, immediately after pause time Δt, integrator 153 outputs DC voltage VDC2 immediately before pause time Δt applied from sample and hold circuit 156, as an integral term.

FIG. 13 is a time chart illustrating control of converter 1 in the intermittent commutation mode by converter controller 13 according to the present embodiment. FIG. 13 shows three phase AC voltages VU, VV, VW, commutation command CM, DC voltage VDC2 appearing between input terminals 2a and 2b of inverter 2, DC voltage VDC1 appearing between output terminals 1a and 1b of converter 1, the integral term in current controller 15, and DC current Id flowing through DC reactor 3.

As shown in FIG. 13, the integral term in integrator 153 is reset to zero at the point of time when commutation command CM is generated and thereafter is preset immediately after pause time Δt. Here, the measured value of DC voltage VDC2 immediately before pause time Δt is used as a preset value. Thus, immediately after pause time Δt, the integral term steeply increases from zero to a value equal to the measured value of DC voltage VDC2 immediately before pause time Δt.

Since the integral term steeply increases immediately after pause time Δt, voltage command value VDC1* that is the sum of the integral term and the proportional term also steeply increases. Therefore, DC voltage VDC1 appearing between the output terminals of converter 1 immediately after pause time Δt steeply increases. Since DC voltage VDC1 steeply increases, DC current Id flowing through DC reactor 3 can be increased steeply from zero to equivalent to current command value Id*.

As described above, in converter controller 13 according to the present second embodiment, since the measured value of DC voltage VDC2 input to inverter 2 immediately before pause time Δt is used as the preset value of the integral term in PI calculation immediately after pause time Δt, slow rising of DC current Id immediately after pause time Δt due to an error in the estimate value of DC voltage VDC2 can be prevented, unlike the comparison example using the estimate value of DC voltage VDC2 as the preset value. Thus, DC current Id can follow current command value Id* fast immediately after pause time Δt, thereby improving the stability in speed control of synchronous machine 20 in the intermittent commutation mode.

Third Embodiment

In thyristor starter 100 according to the present third embodiment, DC voltage VDC2 between input terminals 2a and 2b of inverter 2 is calculated based on three phase AC voltages VU, VV, VW detected by voltage detector 6 and a gate pulse (firing command) applied to the gate of a thyristor in inverter 2. When PI calculation is resumed immediately after the pause time, the calculated DC voltage VDC2 is used as the preset value of the integral element immediately after pause time Δt.

As described with reference to FIG. 1, voltage detector 6 is configured to detect two line voltages (in the example in FIG. 1, line voltages VU-VV and VV-VW) of the line voltages of three phase AC voltages VU, VV, VW supplied from inverter 2 to synchronous machine 20. On the other hand, inverter 2 is configured such that one of thyristors U, V, W and one of thyristors X, Y, Z are conducting in synchronization with three phase AC voltages VU, VV, VW, as shown in FIG. 3 and FIG. 4.

In accordance with transition of the conducting thyristors, line voltages VU-VV, VV-VW, and VW-VU of synchronous machine 20 successively appear as DC voltage VDC2 between input terminals 2a and 2b of inverter 2. Therefore, DC voltage VDC2 can be obtained based on the line voltage of synchronous machine 20 detected by voltage detector 6 and a combination of gate pulses of inverter 2.

With this configuration, compared with DC voltage VDC2 estimated based on the rotation speed of synchronous machine 20, the effect of the impedance component of synchronous machine 20 or an error in voltage control in synchronous machine 20 is suppressed, thereby reducing an error between the estimate value of DC voltage VDC2 and DC voltage VDC2 actually appearing between the input terminals of inverter 2. This can improve the following characteristic of DC current Id immediately after pause time Δt.

Figure 14:
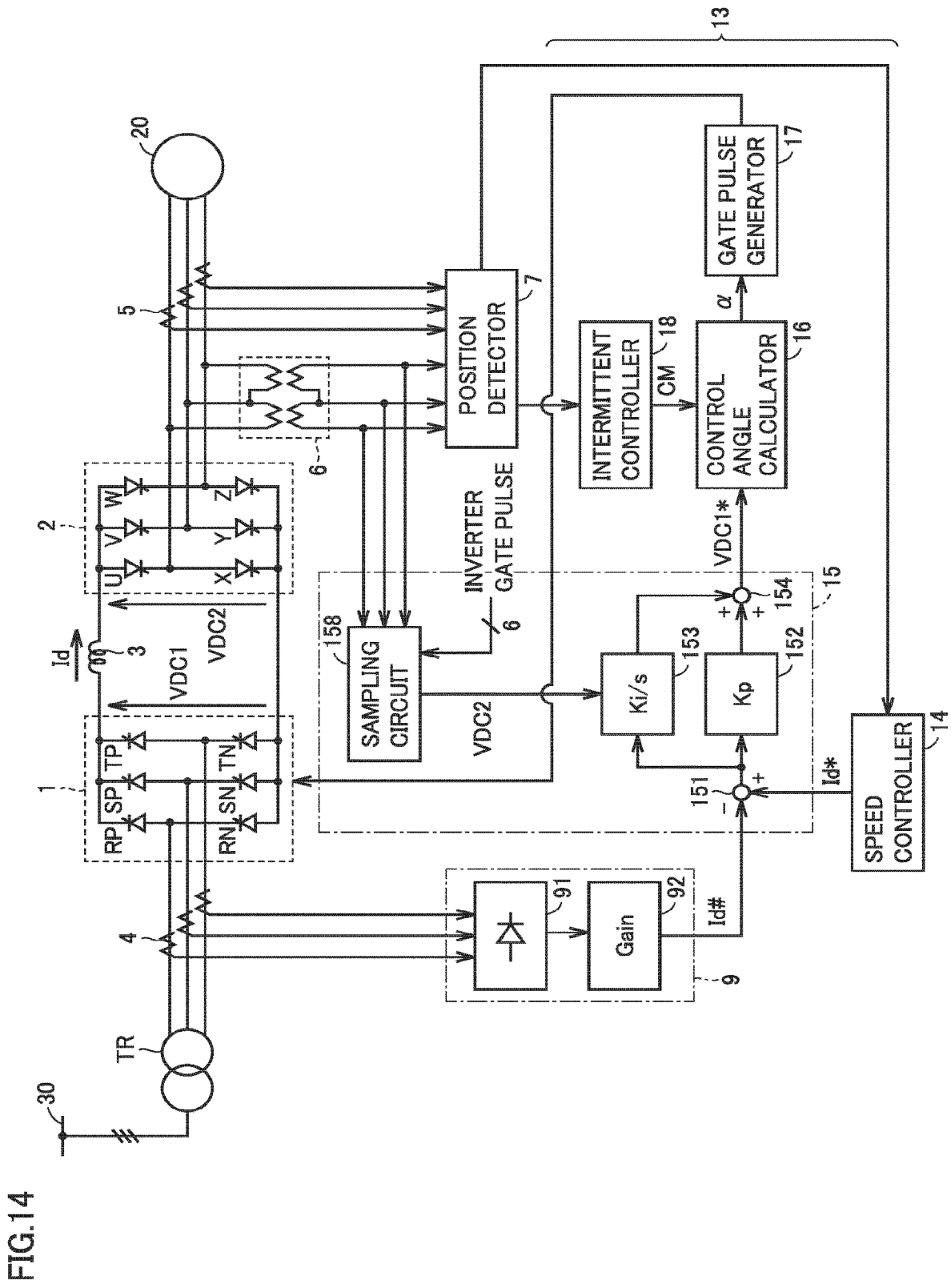
FIG. 14 is a functional block diagram showing a configuration of the converter controller included in the thyristor starter according to the present third embodiment.
Figure 15:
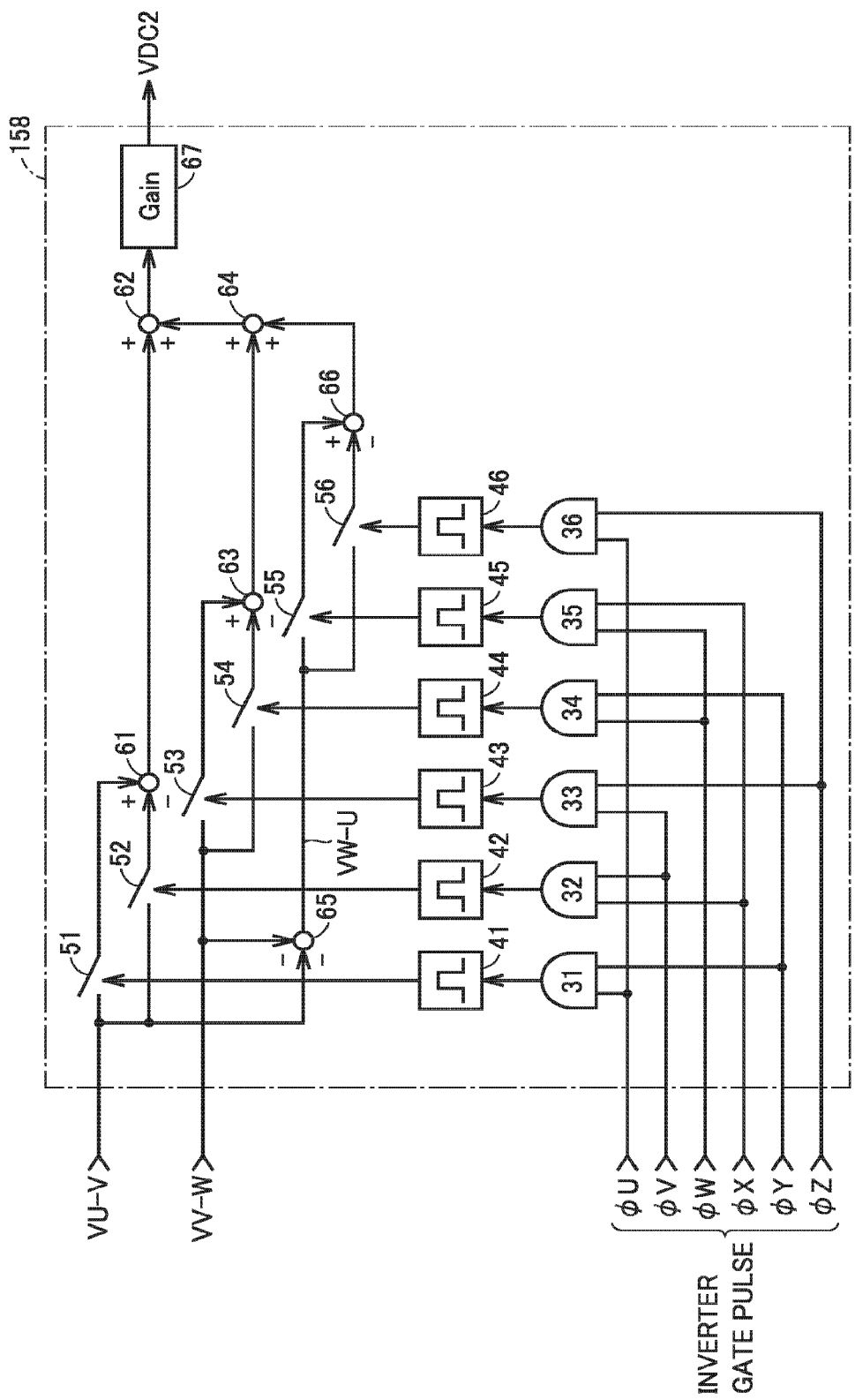
FIG. 15 is a circuit diagram showing a configuration of a sampling circuit shown in FIG. 14.
Figure 16:
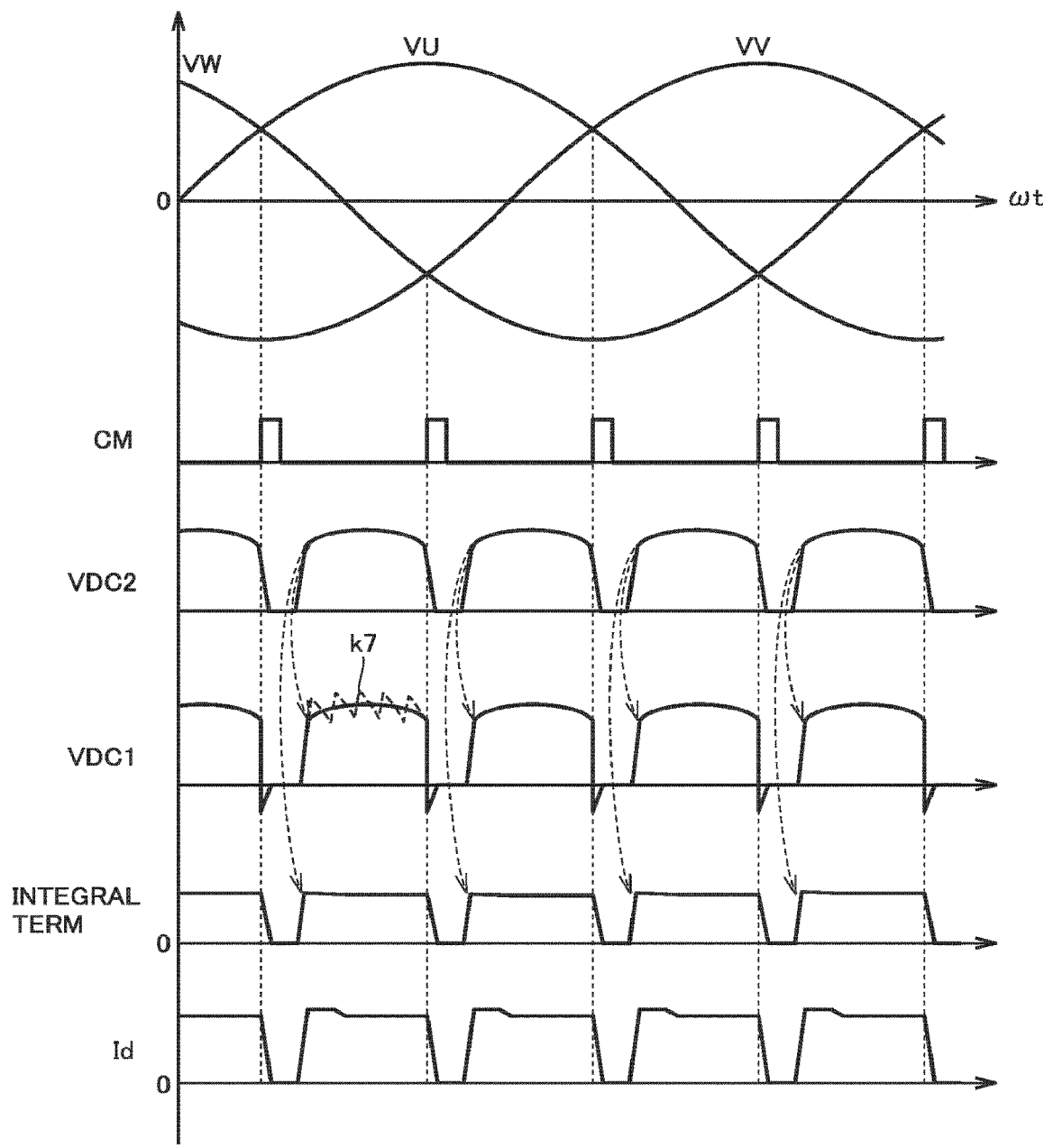
FIG. 16 is a time chart illustrating control of the converter in the intermittent commutation mode by the converter controller according to the present third embodiment.

Referring to FIG. 14 to FIG. 16, the control of converter 1 in thyristor starter 100 according to the present third embodiment will be described below.

FIG. 14 is a functional block diagram showing a configuration of converter controller 13 included in thyristor starter 100 according to the present third embodiment.

Referring to FIG. 14, converter controller 13 according to the present third embodiment differs from converter controller 13A according to a comparative example shown in FIG. 6 in that it includes current controller 15 instead of current controller 15A. The configuration of other portions in FIG. 14 is the same as in FIG. 6 and will not be further elaborated here.

Current controller 15 generates voltage command value VDC1* by performing control calculation (PI calculation) of deviation ΔId between current command value Id* and DC current Id #. Current controller 15 includes a subtracter 151, a comparator 152, an integrator 153, an adder 154, and a sampling circuit 158. Current controller 15 differs from current controller 15A shown in FIG. 6 in that it includes sampling circuit 158 instead of gain multiplier 155.

Sampling circuit 158 calculates DC voltage VDC2 between input terminals 2a and 2b of inverter 2, based on line voltages VU-VV, VV-VW, VW-VU of synchronous machine 20 detected by voltage detector 6 and the gate pulses of inverter 2.

FIG. 15 is a circuit diagram showing a configuration of sampling circuit 158 shown in FIG. 14.

Referring to FIG. 15, sampling circuit 158 includes AND gates 31 to 36, one-shot pulse generators 41 to 46, switches 51 to 56, subtracters 61, 63, 66, adders 62, 64, 65, and a gain multiplier 67. In FIG. 15, ϕU, ϕV, ϕZ, ϕX, ϕY, ϕZ denote gate pulses applied to thyristors U, V, W, X, Y, Z, respectively, of inverter 2.

AND gate 31 outputs an AND signal of gate pulses ϕU and ϕY. One-shot pulse generator 41 generates a one-shot pulse signal having a predetermined pulse width in response to the rising edge of an output signal of AND gate 31.

AND gate 32 outputs an AND signal of gate pulses ϕV and ϕX. One-shot pulse generator 42 generates a one-shot pulse signal having a predetermined pulse width in response to the rising edge of an output signal of AND gate 32.

AND gate 33 outputs an AND signal of gate pulses ϕV and ϕZ. One-shot pulse generator 43 generates a one-shot pulse signal having a predetermined pulse width in response to the rising edge of an output signal of AND gate 33.

AND gate 34 outputs an AND signal of gate pulses ϕW and ϕY. One-shot pulse generator 44 generates a one-shot pulse signal having a predetermined pulse width in response to the rising edge of an output signal of AND gate 34.

AND gate 35 outputs an AND signal of gate pulses ϕW and ϕX. One-shot pulse generator 45 generates a one-shot pulse signal having a predetermined pulse width in response to the rising edge of an output signal of AND gate 35.

AND gate 36 outputs an AND signal of gate pulses ϕU and ϕZ. One-shot pulse generator 46 generates a one-shot pulse signal having a predetermined pulse width in response to the rising edge of an output signal of AND gate 31. The predetermined pulse width in one-shot pulse generators 41 to 46 is set in accordance with the pulse width of the gate pulse.

One terminal of switch 51 receives line voltage VU-V. Switch 51 turns on in a period of time in which the pulse signal output from one-shot pulse generator 41 is H level and turns off in a period of time in which the pulse signal is L level.

One terminal of switch 52 receives line voltage VU-V. Switch 52 turns on in a period of time in which the pulse signal output from one-shot pulse generator 42 is H level and turns off in a period of time in which the pulse signal is L level. Subtracter 61 subtracts voltage of the other terminal of switch 52 from voltage of the other terminal of switch 51.

One terminal of switch 53 receives line voltage VV-W. Switch 53 turns on in a period of time in which the pulse signal output from one-shot pulse generator 43 is H level and turns off in a period of time in which the pulse signal is L level.

One terminal of switch 54 receives line voltage VV-W. Switch 54 turns on in a period of time in which the pulse signal output from one-shot pulse generator 44 is H level and turns off in a period of time in which the pulse signal is L level. Subtracter 63 subtracts voltage of the other terminal of switch 54 from voltage of the other terminal of switch 53.

Subtracter 65 adds a voltage lagging 180° behind the phase of line voltage VU-V and a voltage lagging 180° behind the phase of line voltage VV-W to generate line voltage VW-U. One terminal of switch 55 receives line voltage VW-U. Switch 55 turns on in a period of time in which the pulse signal output from one-shot pulse generator 45 is H level and turns off in a period of time in which the pulse signal is L level.

One terminal of switch 56 receives line voltage VW-U. Switch 56 turns on in a period of time in which the pulse signal output from one-shot pulse generator 46 is H level and turns off in a period of time in which the pulse signal is L level. Subtracter 66 subtracts voltage of the other terminal of switch 56 from voltage of the other terminal of switch 55.

Adders 62, 64 add the output signals of subtracters 61, 63, 66. Gain multiplier 67 multiplies the output signal of adder 62 by gain K3 to generate DC voltage VDC2.

As described with reference to FIG. 4, in the intermittent commutation mode, commutation command CM is generated in synchronization with a reference point appearing every electrical angle 60° of synchronous machine 20, and two of six thyristors in inverter 2 are fired after pause time Δt has passed since the point of time when commutation command CM is generated.

In sampling circuit 158, when two thyristors are fired, the output signals of the corresponding AND gates rise to H level, and the corresponding one-shot pulse generators generate a pulse signal in response to the output signals. In a period of time in which the pulse signal is H level, the corresponding switch turns on, whereby DC voltage VDC2 is generated based on the line voltage appearing between input terminals 2a and 2b of inverter 2 by the two thyristors. Therefore, sampling circuit 158 can obtain DC voltage VDC2 appearing between input terminals 2a and 2b of inverter 2 immediately after pause time Δt.

Returning to FIG. 14, sampling circuit 158 outputs the calculated DC voltage VDC2 to integrator 153. Integrator 153 presets the estimate value of DC voltage VDC2 immediately after pause time Δt, in the integral term.

FIG. 16 is a time chart illustrating control of converter 1 in the intermittent commutation mode by converter controller 13 according to the present embodiment.

FIG. 16 shows three phase AC voltages VU, VV, VW, commutation command CM, DC voltage VDC2 appearing between input terminals 2a and 2b of inverter 2, DC voltage VDC1 appearing between output terminals 1a and 1b of converter 1, the integral term in current controller 15, and DC current Id flowing through DC reactor 3.

As shown in FIG. 16, the integral term in integrator 153 is reset to zero at the point of time when commutation command CM is generated and thereafter is preset immediately after pause time Δt. Here, DC voltage VDC2 immediately after pause time Δt obtained by sampling circuit 158 is used as the preset value. Thus, immediately after pause time Δt, the integral term steeply increases from zero to equivalent to DC voltage VDC2 immediately after pause time Δt.

Since the integral term steeply increases immediately after pause time Δt, voltage command value VDC1* that is the sum of the integral term and the proportional term also steeply increases. Therefore, DC voltage VDC1 appearing between the output terminals of converter 1 immediately after pause time Δt steeply increases. Since DC voltage VDC1 steeply increases, DC current Id flowing through DC reactor 3 can be increased steeply from zero to equivalent to current command value Id*.

As described above, in converter controller 13 according to the present third embodiment, DC voltage VDC2 between the input terminals of inverter 2 is calculated based on the detected value of AC voltage supplied from inverter 2 to synchronous machine 20 and the gate pulses of inverter 2, and DC voltage VDC2 calculated immediately after pause time Δt is used as the preset value of the integral term in PI calculation immediately after pause time Δt. This configuration can prevent slow rising of DC current Id immediately after pause time Δt due to an error in the estimate value of DC voltage VDC2, unlike the comparative example using the estimate value of DC voltage VDC2 based on the rotation speed of synchronous machine 20 as the preset value. Therefore, DC current Id can follow current command value Id* fast immediately after pause time Δt, thereby improving the stability in speed control of synchronous machine 20 in the intermittent commutation mode.

Fourth Embodiment

Referring to FIG. 7 again, the integral term in integrator 153 is reset to zero at the point of time when commutation command CM is generated. Immediately after pause time Δt, the integral term is preset to the estimate value of DC voltage VDC2 obtained from the rotation speed of synchronous machine 20.

Here, when the estimate value of DC voltage VDC2 matches DC voltage VDC2 actually appearing between the input terminals of inverter 2, the integral term attains a value indicated by broken line k3 in the figure. That is, the integral term steeply increases from zero to the actual DC voltage VDC2 and thereafter gradually changes in accordance with deviation ΔId.

When the integral term increases like the waveform indicated by broken line k3 immediately after pause time Δt, voltage command value VDC1* that is the sum of the integral term and the proportional term also steeply increases. Therefore, DC voltage VDC1 appearing between the output terminals of converter 1 immediately after pause time Δt steeply increases like the waveform indicated by broken line k1 in the figure. DC voltage VDC1 appearing between the output terminals of converter 1 ripples as indicated by broken line k7 and is smoothed by DC reactor 3 as indicated by broken line k1. Since DC voltage VDC1 steeply increases, DC current Id flowing through DC reactor 3 can steeply rise from zero as indicated by broken line k5 and follow current command value Id* fast.

However, contrary to the ideal, the rising of DC voltage VDC1 appearing between the output terminals of converter 1 immediately after pause time Δt is slow as indicated by solid line k2 in the figure. Since DC voltage VDC1 becomes lower than the ideal value, the rising of DC current Id becomes slow as indicated by solid line k6 in the figure immediately after pause time Δt, and DC current Id is unable to follow current command value Id* fast.

In this way, when the target following characteristic of DC current Id decreases, the acceleration torque of synchronous machine 20 may temporarily decrease immediately after pause time Δt. Thus, the torque of synchronous machine 20 fluctuates every time commutation command CM is generated, and consequently, the speed control of synchronous machine 20 in the intermittent commutation mode may become unstable. Moreover, since the speed-up rate of synchronous machine 20 is reduced, it may take time to start synchronous machine 20.

The delayed rising of DC current Id immediately after pause time Δt may be due to the effect of commutation inductance included in the circuit (AC power supply 30 and transformer TR) on the input side of converter 1. Because of this commutation inductance, current flowing through converter 1 does not change instantaneously but changes over a finite time. The commutation inductance impedes instantaneous change of current, whereby a voltage drop against the ideal value occurs in DC voltage VDC1 appearing between the output terminals of converter 1 immediately after pause time Δt.

Figure 17:
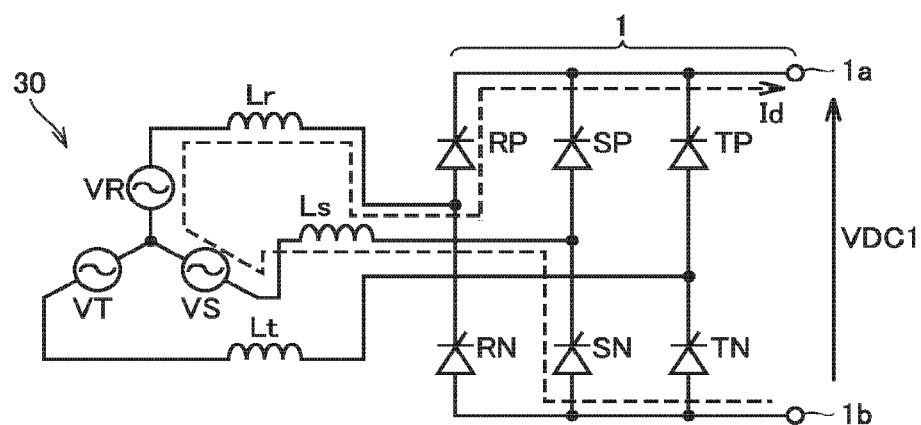
FIG. 17 is a circuit diagram showing current flowing through the converter.

FIG. 17 is a circuit diagram showing current flowing through converter 1. In FIG. 17, AC power supply 30 and transformer TR include three phase inductances Lr, Ls, Lt. For example, when thyristors RP and SN are conducting, DC current Id starts flowing through inductances Lr and Ls, immediately after pause time Δt. In this case, the sum of inductances Lr and Ls corresponds to commutation inductance L (L=Lr+Ls).

Let vL be a voltage drop in commutation inductance L, vL=L×dId/dt. By integrating this equation, the amount of voltage drop when DC current Id rises from zero to current command value Id* immediately after pause time Δt is given by L Id*.

In this way, in converter controller 13A according to a comparative example, although the preset value of the integral term in PI calculation immediately after pause time Δt is set to the estimate value of DC voltage VDC2 based on the rotation speed of synchronous machine 20, DC current Id may fail to follow current command value Id* fast immediately after pause time Δt, due to the effect of commutation inductance L included in the circuit on the input side of converter 1.

Then, in thyristor starter 100 according to the present fourth embodiment, when PI calculation is resumed immediately after pause time Δt, a value obtained by adding the amount of voltage drop by commutation inductance L on the input side of converter 1 to DC voltage VDC2 estimated based on the rotation speed of synchronous machine 20 is used as the preset value of the integral element immediately after pause time Δt. That is, the preset value of the integral element is corrected such that the amount of voltage drop by commutation inductance is compensated for.

Figure 18:
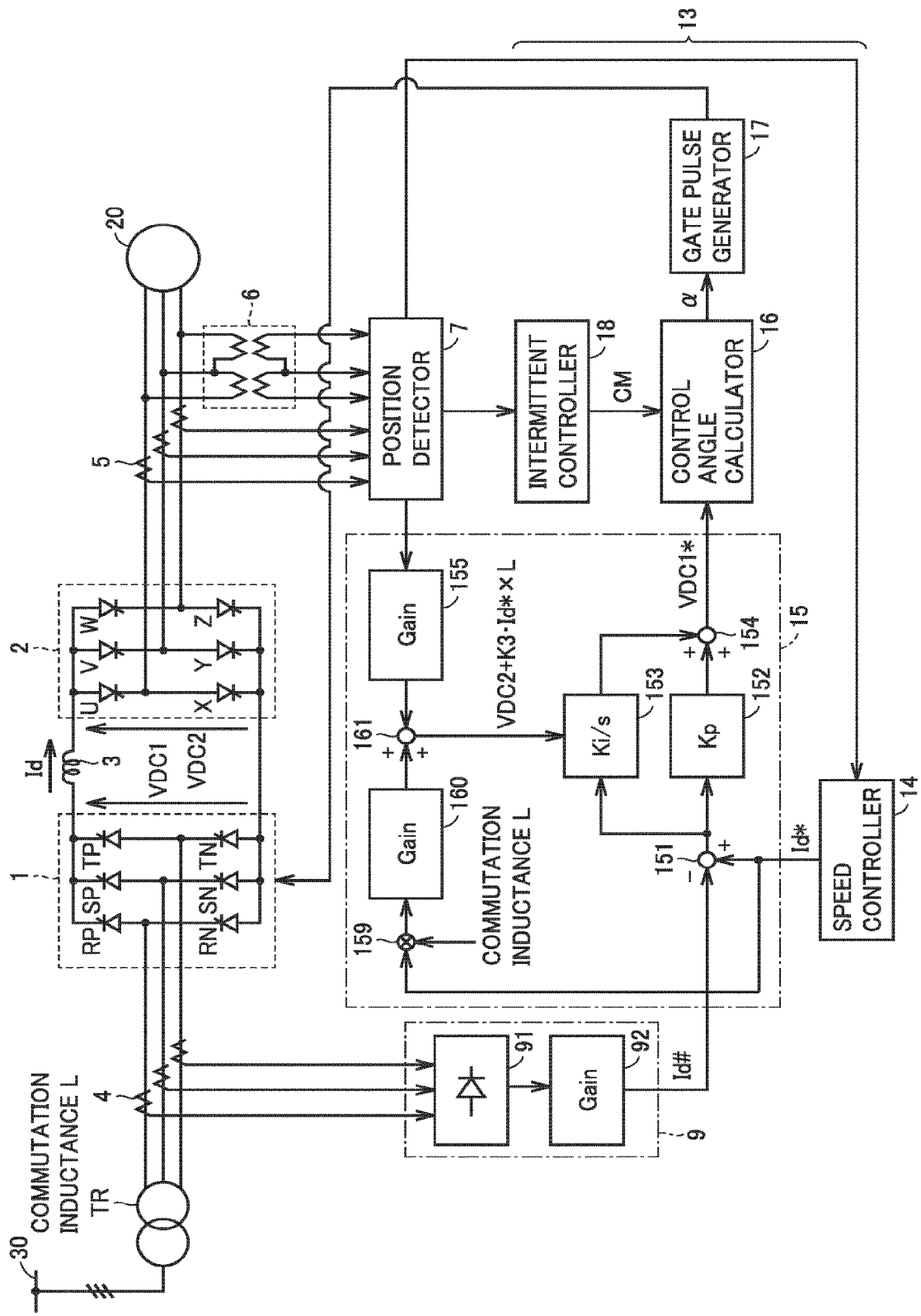
FIG. 18 is a functional block diagram showing a configuration of the converter controller included in the thyristor starter according to the present fourth embodiment.
Figure 19:
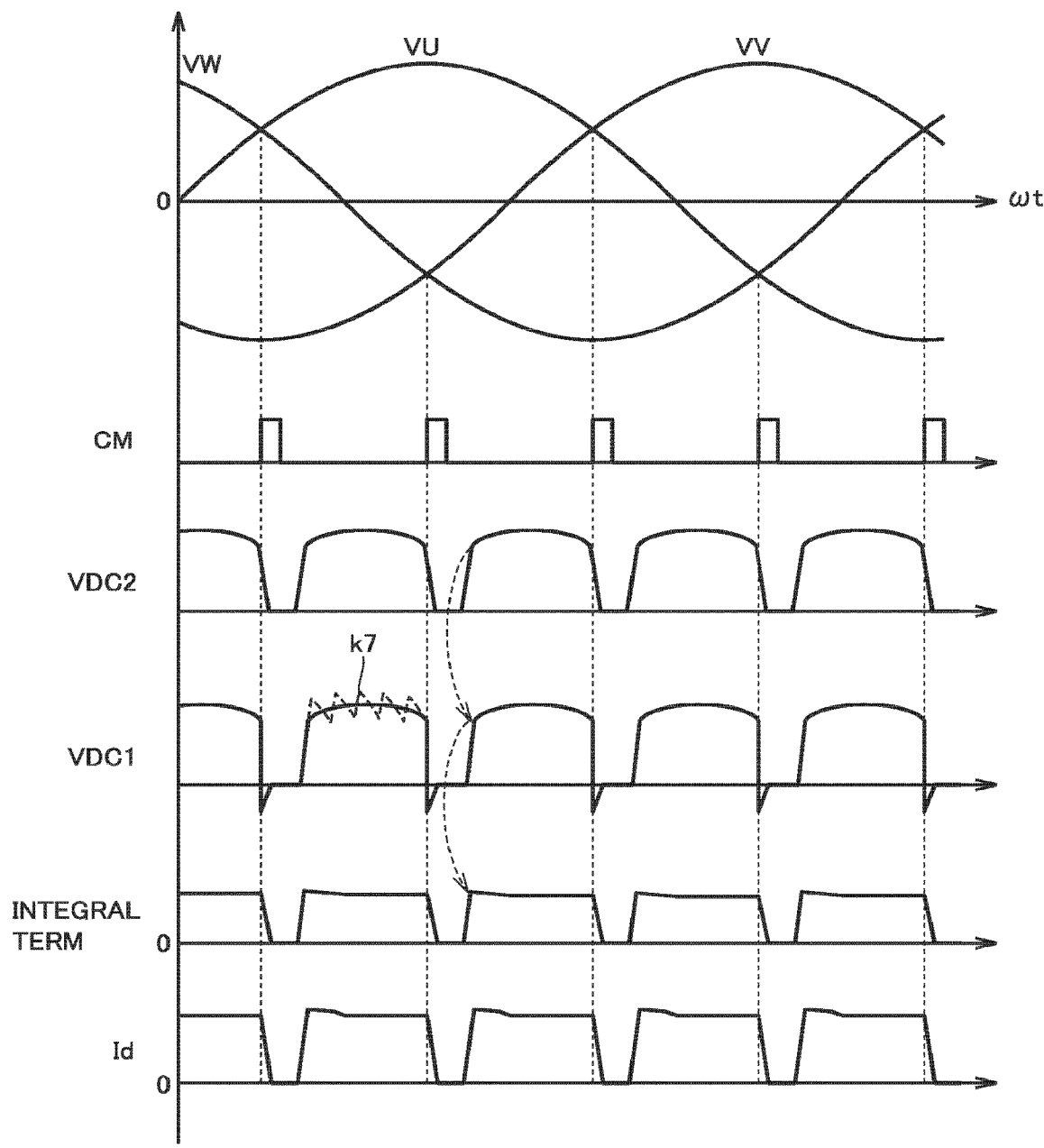
FIG. 19 is a time chart illustrating control of the converter in the intermittent commutation mode by the converter controller according to the present fourth embodiment.

Referring now to FIG. 18 and FIG. 19, the control of converter 1 in thyristor starter 100 according to the present fourth embodiment will be described.

FIG. 18 is a functional block diagram showing a configuration of converter controller 13 included in thyristor starter 100 according to the present fourth embodiment.

Referring to FIG. 18, converter controller 13 according to the present fourth embodiment differs from converter controller 13A according to a comparative example shown in FIG. 6 in that it includes current controller 15 instead of current controller 15A. The configuration of other portions in FIG. 18 is the same as in FIG. 6 and will not be further elaborated here.

Current controller 15 generates voltage command value VDC1* by performing control calculation (PI calculation) of deviation ΔId between current command value Id* and DC current Id #. Current controller 15 includes a subtracter 151, a comparator 152, an integrator 153, an adder 154, gain multipliers 155, 160, a multiplier 159, and an adder 161. Current controller 15 differs from current controller 15A shown in FIG. 6 in that multiplier 159, gain multiplier 160, and adder 161 are added.

Multiplier 159 multiplies current command value Id* generated by speed controller 14 by commutation inductance L included in the circuit (AC power supply 30 and transformer TR) on the input side of converter 1. Gain multiplier 160 multiplies the multiplied value of current command value Id* and commutation inductance L by gain K3. The value (K3·Id*×L) obtained by multiplying the multiplied value of current command value Id* and commutation inductance L by gain K3 corresponds to the amount of voltage drop by commutation inductance L.

Adder 161 corrects the estimate value of DC voltage VDC2 by adding the estimate value of DC voltage VDC2 calculated by gain multiplier 155 and the amount of voltage drop by commutation inductance L calculated by gain multiplier 160. Adder 161 outputs the corrected estimate value of DC voltage VDC2 to integrator 153. Integrator 153 presets the corrected estimate value of DC voltage VDC2 in the integral term immediately after pause time Δt.

FIG. 19 is a time chart illustrating control of converter 1 in the intermittent commutation mode by converter controller 13 according to the present embodiment. FIG. 19 shows three phase AC voltages VU, VV, VW, commutation command CM, DC voltage VDC2 appearing between input terminals 2a and 2b of inverter 2, DC voltage VDC1 appearing between output terminals 1a and 1b of converter 1, the integral term in current controller 15, and DC current Id flowing through DC reactor 3.

As shown in FIG. 19, the integral term in integrator 153 is reset to zero at the point of time when commutation command CM is generated and thereafter is preset immediately after pause time Δt. Here, the added value of the estimate value of DC voltage VDC2 and the amount of voltage drop by commutation inductance on the input side of converter 1 is used as a preset value of the integral term.

Since the estimate value of DC voltage VDC2 serving as the preset value includes the amount of voltage drop by commutation inductance, the amount of voltage drop by commutation inductance is also added to voltage command value VDC1* that is the sum of the integral term and the proportional term, immediately after pause time Δt. As a result, DC voltage VDC1 appearing between the output terminals of converter 1 immediately after pause time Δt steeply increases because the voltage drop by commutation inductance is cancelled. Since DC voltage VDC1 steeply increases, DC current Id flowing through DC reactor 3 can be increased steeply from zero to equivalent to current command value Id*.

As described above, in converter controller 13 according to the present fourth embodiment, since the value obtained by adding the amount of voltage drop by commutation inductance on the input side of converter 1 to DC voltage VDC2 estimated based on the rotation speed of synchronous machine 20 is used as the preset value of the integral term in PI calculation immediately after pause time Δt, slow rising of DC current Id immediately after pause time Δt can be prevented, unlike the comparative example using only the estimate value of DC voltage VDC2 as a preset value. Thus, DC current Id can follow current command value Id* fast immediately after pause time Δt, thereby improving the stability in speed control of synchronous machine 20 in the intermittent commutation mode.

The embodiments disclosed here should be understood as being illustrative in all respects and should not be construed as being limitative. The scope of the present invention is shown not in the foregoing description but in the claims, and it is intended that all modifications that come within the meaning and range of equivalence to the claims are embraced here.

REFERENCE SIGNS LIST 1 converter, 1a positive-side output terminal, 1b negative-side output terminal, 1c, 1d, 1e input terminal, 2 inverter, 2a positive-side input terminal, 2b negative-side input terminal, 2c, 2d, 2e output terminal, 3 DC reactor, 4, 5 current transformer, 6 voltage detector, 7 position detector, 9 current detector, 10 inverter controller, 11, 16 control angle calculator, 12, 17 gate pulse generator, 13, 13A converter controller, 14 speed controller, 15, 15A current controller, 18 intermittent controller, 19 voltage detector, 20 synchronous machine, 22 field winding, 30 AC power supply, 31 to 36 AND gate, 41 to 46 one-shot pulse generator, 51 to 56 switch, 61, 63, 66 subtracter, 62, 64, 65 adder, 91 rectifier, 67, 92, 155, 157, 160, 162 gain multiplier, 100 thyristor starter, 151 subtracter, 152 comparator, 153 integrator, 154, 161 adder, 156 sample and hold circuit, 158 sampling circuit, 159 multiplier, ATU, ATV, ATW armature winding, U, V, W, X, Y, Z, RP, SP, TP, RN, SN, TN thyristor, TR transformer, CM commutation command.

The invention claimed is:

1. A thyristor starter configured to start a synchronous machine, comprising:
   a converter that converts AC power into DC power;
   a DC reactor that smoothes the DC power;
   an inverter that converts the DC power applied from the converter through the DC reactor into AC power with a variable frequency and supplies the AC power to the synchronous machine;
   a position detector that detects a rotor position of the synchronous machine;
   a first controller that controls a firing phase of a thyristor in the inverter, based on a detection signal of the position detector; and
   a second controller that controls a firing phase of a thyristor in the converter such that DC current flowing through the DC reactor matches a current command value, based on a detection signal of the position detector, wherein
   the thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine,
   the second controller includes
      a current controller at least including an integral element integrating a deviation of the DC current from the current command value, the current controller generates a voltage command value of output voltage of the converter by performing control calculation of the deviation, and
      a control angle calculator that calculates a phase control angle of a thyristor in the converter, based on the voltage command value,
   in the first mode, the control angle calculator sets the DC current to zero for a predetermined pause time by narrowing the phase control angle simultaneously with a commutation command for the inverter, and
   in the first mode, when the control calculation is resumed immediately after the pause time, the current controller uses a control amount calculated by the control calculation immediately before the pause time as a preset value of the integral element immediately after the pause time.

2. The thyristor starter according to claim 1, wherein in the first mode, the current controller uses output of the integral element immediately before the pause time as the preset value of the integral element immediately after the pause time.

3. The thyristor starter according to claim 1, wherein in the first mode, the current controller uses the voltage command value generated immediately before the pause time as the preset value of the integral element immediately after the pause time.

4. A thyristor starter configured to start a synchronous machine, comprising:
   a converter that converts AC power into DC power;
   a DC reactor that smoothes the DC power;
   an inverter that converts the DC power applied from the converter through the DC reactor into AC power with a variable frequency and supplies the AC power to the synchronous machine;
   a position detector that detects a rotor position of the synchronous machine;
   a voltage detector that detects DC voltage input to the inverter;
   a first controller that controls a firing phase of a thyristor in the inverter, based on a detection signal of the position detector; and
   a second controller that controls a firing phase of a thyristor in the converter such that DC current flowing through the DC reactor matches a current command value, based on a detection signal of the position detector, wherein
   the thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine,
   the second controller includes
      a current controller at least including an integral element integrating a deviation of the DC current from the current command value, the current controller generates a voltage command value of output voltage of the converter by performing control calculation of the deviation, and a control angle calculator that calculates a phase control angle of a thyristor in the converter, based on the voltage command value, in the first mode, the control angle calculator sets the DC current to zero for a predetermined pause time by narrowing the phase control angle simultaneously with a commutation command for the inverter, and in the first mode, when the control calculation is resumed immediately after the pause time, the current controller uses DC voltage detected by the voltage detector immediately before the pause time as a preset value of the integral element immediately after the pause time.

5. The thyristor starter according to claim 4, wherein the second controller includes a sample and hold circuit that takes in and holds a detection signal of the voltage detector at timing when a commutation command for the inverter is generated, and the current controller uses the detection signal held in the sample and hold circuit as the preset value of the integral element immediately after the pause time.

6. A thyristor starter configured to start a synchronous machine, comprising:

a converter that converts AC power into DC power;

a DC reactor that smoothes the DC power;

an inverter that converts the DC power applied from the converter through the DC reactor into AC power with a variable frequency and supplies the AC power to the synchronous machine;

a voltage detector that detects AC voltage supplied from the inverter to the synchronous machine;

a first controller that generates a firing command to be applied to a thyristor in the inverter, based on a detection signal of the voltage detector; and a second controller that controls a firing phase of a thyristor in the converter such that DC current flowing through the DC reactor matches a current command value, wherein the thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine, the second controller includes a current controller at least including an integral element integrating a deviation of the DC current from the current command value, the current controller generates a voltage command value of output voltage of the converter by performing control calculation of the deviation, and a control angle calculator that calculates a phase control angle of a thyristor in the converter, based on the voltage command value, in the first mode, the control angle calculator sets the DC current to zero for a predetermined pause time by narrowing the phase control angle simultaneously with a commutation command for the inverter, and in the first mode, the current controller calculates DC voltage appearing between input terminals of the inverter, based on a detection signal of the voltage detector and the firing command, and when the control calculation is resumed immediately after the pause time, uses the calculated DC voltage as a preset value of the integral element immediately after the pause time.

7. The thyristor starter according to claim 6, wherein in the first mode, the current controller calculates DC voltage appearing between input terminals of the inverter immediately after the pause time, based on a detection signal of the voltage detector and the firing command.

8. The thyristor starter according to claim 6, wherein the AC voltage is three phase AC voltage, and the voltage detector detects at least two line voltages of the three phase AC voltage.

9. A thyristor starter configured to start a synchronous machine, comprising:

a converter that converts AC power supplied from an AC power supply into DC power;

a DC reactor that smoothes the DC power;

an inverter that converts the DC power applied from the converter through the DC reactor into AC power with a variable frequency and supplies the AC power to the synchronous machine;

a first controller that controls a firing phase of a thyristor in the inverter; and a second controller that controls a firing phase of a thyristor in the converter such that DC current flowing through the DC reactor matches a current command value, wherein the thyristor starter accelerates the synchronous machine from a stop state to a predetermined rotation speed by successively performing a first mode of performing commutation of the inverter by intermittently setting the DC current to zero and a second mode of performing commutation of the inverter by induced voltage of the synchronous machine, the second controller includes a current controller at least including an integral element integrating a deviation of the DC current from the current command value, the current controller generates a voltage command value of output voltage of the converter by performing control calculation of the deviation, and a control angle calculator that calculates a phase control angle of a thyristor in the converter, based on the voltage command value, in the first mode, the control angle calculator sets the DC current to zero for a predetermined pause time by narrowing the phase control angle simultaneously with a commutation command for the inverter, and in the first mode, when the control calculation is resumed immediately after the pause time, the current controller uses a value obtained by adding an amount of voltage drop by commutation inductance on an input side of the converter to an estimate value of DC voltage input to the inverter, as a preset value of the integral element immediately after the pause time.

10. The thyristor starter according to claim 9, wherein in the first mode, the current controller calculates the amount of voltage drop by the commutation inductance by multiplying the current command value by the commutation inductance.

11. The thyristor starter according to claim 9, further comprising a position detector that detects a rotor position of the synchronous machine, wherein the second controller calculates a rotation speed of the synchronous machine based on a detection signal of the position detector and generates the current command value based on the calculated rotation speed of the synchronous machine, and the current controller estimates the DC voltage based on the calculated rotation speed of the synchronous machine.

* * * * *